United States Patent [19]

Bauer et al.

[11] 4,144,231
[45] Mar. 13, 1979

[54] SOLUBLE TRISAZO DYESTUFFS CONTAINING A 2-PHENYL-BENZIMIDAZOLYL, -BENZOXAZOLYL OR -BENZTHIAZOLYL MIDDLE COMPONENT

[75] Inventors: Wolfgang Bauer, Maintal; Joachim Ribka, Offenbach am Main-Burgel, both of Fed. Rep. of Germany

[73] Assignee: Cassella Aktiengesellschaft, Frankfurt am Main, Fed. Rep. of Germany

[21] Appl. No.: 795,435

[22] Filed: May 10, 1977

[30] Foreign Application Priority Data

May 19, 1976 [DE] Fed. Rep. of Germany ....... 2622303

[51] Int. Cl.$^2$ .................................... C09B 35/36
[52] U.S. Cl. ............................... 260/157; 260/141; 260/155; 260/156; 260/158; 260/159; 260/160
[58] Field of Search ............... 260/157, 158, 155, 156, 260/159

[56] References Cited

U.S. PATENT DOCUMENTS 4,033,945  7/1977  Bauer et al. ..................... 260/157

Primary Examiner—Charles F. Warren
Attorney, Agent, or Firm—Connolly & Hutz

[57] ABSTRACT

A water soluble trisazo dyestuff of the formula $B_1$—N=N—Z-N=N-M-N=N-$B_2$ is useful for dyeing substances containing nitrogen or hydroxyl wherein M is

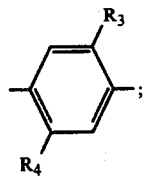

$B_1$ and $B_2$ are the same or different and are selected from the group consisting of

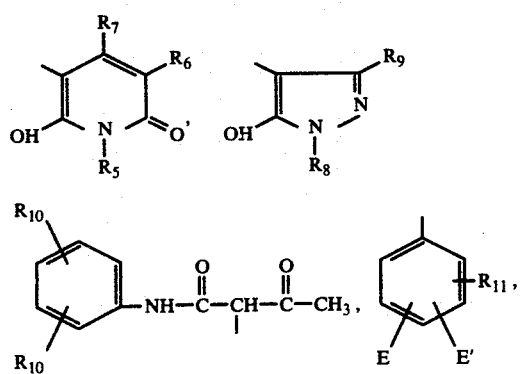

-continued

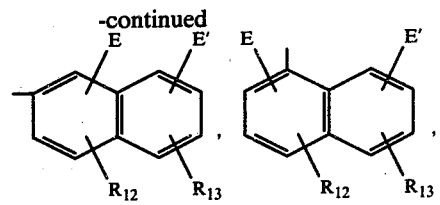

2,4-dihydroxy-3-quinolyl and 2,6-diamino-5-pyridyl; Z is

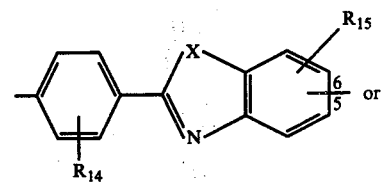

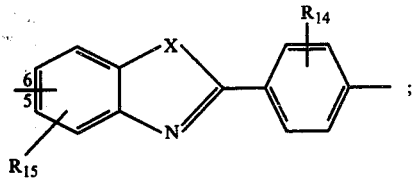

X is

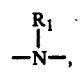

—O— or —S—; $R_1$ is hydrogen, alkyl having 1 to 4 carbon atoms, phenyl or benzyl; $R_3$ is hydrogen, chloro or alkyl or alkoxy having 1 to 4 carbon atoms;

$R_4$ is hydrogen chloro, alkyl or alkoxy having 1 to 4 carbon atoms, hydroxy, alkanoylamino having 1 to 4 carbon atoms, benzoylamino, naphthoylamino, oxalylamino, carboxyalkylamino having 2 to 5 carbon atoms, sulphoalkylamino having 1 to 4 carbon atoms or oxyalkylamino having 1 to 4 carbon atoms;

$R_5$ is hydrogen or alkyl having 1 to 8 carbon atoms; $R_6$ is —CN, —COOH, —CONH$_2$ or —SO$_3$H; $R_7$ is hydrogen, or alkyl having 1 to 4 carbon atoms, $R_8$ is hydrogen phenyl or phenyl substituted with a methyl, nitro, chloro or sulpho; $R_9$ is methyl, carboxyl or alkoxycarbonyl having 2 to 5 carbon atoms; $R_{10}$ is hydrogen, methyl, methoxy, chloro, —COOH or —SO$_3$H;

E is a hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 5 carbon atoms, sulphoalkylamino having 1 to 4 carbon atoms, hydroxyalkylamino having 1 to 4 carbon atoms dialkylamino having 1 to 4 carbon atoms in each alkyl;

E' is hydrogen or the same or a different member of the group of substituents standing for E;

$R_{11}$, $R_{12}$ and $R_{13}$ are alkyl or alkoxy having 1 to 4 carbon atoms, carboxyl, sulpho, chloro, bromo, nitro or methoxycarbonyl; $R_{14}$ and $R_{15}$ are hydrogen, methyl, ethyl, methoxy, ethoxy or chloro; with the proviso that at least one of M, $B_1$ and $B_2$ includes a sulpho substituent.

13 Claims, No Drawings

SOLUBLE TRISAZO DYESTUFFS CONTAINING A 2-PHENYL-BENZIMIDAZOLYL, -BENZOXAZOLYL OR -BENZTHIAZOLYL MIDDLE COMPONENT

The present invention relates to a water soluble trisazo dyestuff of the formula $B_1-N=N-Z-N=N-M-N=N-B_2$ wherein M is

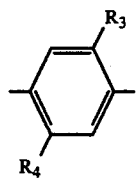

$B_1$ and $B_2$ are the same or different and are selected from the group consisting of

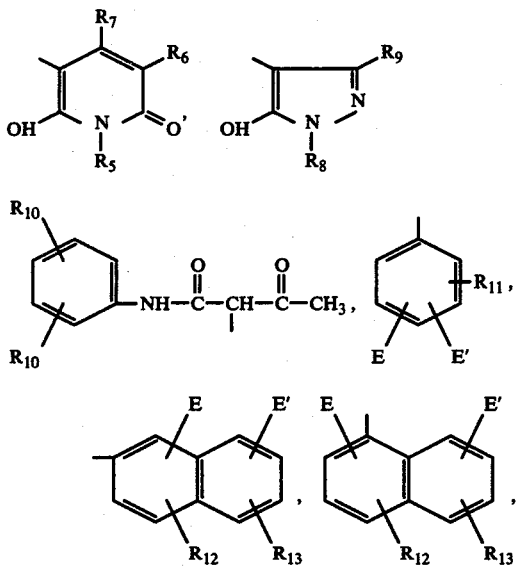

2,4-dihydroxy-3-quinolyl and 2,6-diamino-5-pyridyl; Z is

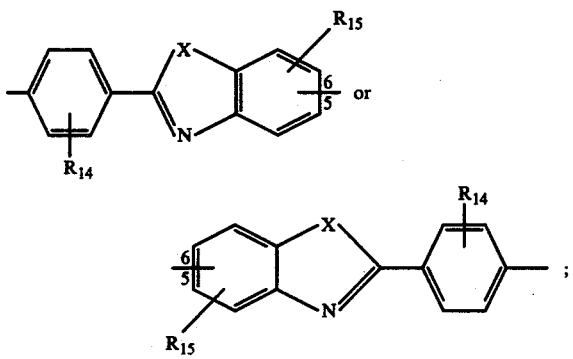

X is

—O— or —S—; $R_1$ is hydrogen, alkyl having 1 to 4 carbon atoms, phenyl or benzyl; $R_3$ is hydrogen, chloro or alkyl or alkoxy having 1 to 4 carbon atoms; $R_4$ is hydrogen chloro, alkyl or alkoxy having 1 to 4 carbon atoms, hydroxy, alkanoylamino having 1 to 4 carbon atoms, benzoylamino, naphthoylamino, oxalylamino, carboxyalkylamino having 2 to 5 carbon atoms, sulphoalkylamino having 1 to 4 carbon atoms or oxyalkylamino having 1 to 4 carbon atoms;

$R_5$ is hydrogen or alkyl having 1 to 8 carbon atoms; $R_6$ is —CN, —COOH, —CONH$_2$ or —SO$_3$H; $R_7$ is hydrogen or alkyl having 1 to 4 carbon atoms; $R_8$ is hydrogen, phenyl or phenyl substituted with a methyl, nitro, chloro or sulpho; $R_9$ is methyl, carboxyl or alkoxycarbonyl having 2 to 5 carbon atoms; $R_{10}$ is hydrogen, methyl, methoxy, chloro, —COOH or —SO$_3$H;

E is a hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 5 carbon atoms, sulphoalkylamino having 1 to 4 carbon atoms, hydroxyalkylamino having 1 to 4 carbon atoms dialkylamino having 1 to 4 carbon atoms in each alkyl;

E' is hydrogen or the same or a different member of the group of substituents standing for E.

$R_{11}$, $R_{12}$ and $R_{13}$ are alkyl or alkoxy having 1 to 4 carbon atoms, carboxyl, sulpho, chloro, bromo, nitro or methoxycarbonyl; $R_{14}$ and $R_{15}$ are hydrogen, methyl, ethyl, methoxy, ethoxy, or chloro; with the proviso that at least one of M, $B_1$ and $B_2$ includes a sulpho substituent. The dyestuff of the present invention is useful for dyeing or printing natural or synthetic material which contains nitrogen or hydroxyl. The dyestuff may be in the form of alkali metal, alkaline earth metal or ammonium salts of the carboxyl or sulpho groups.

One preferred embodiment of the water soluble dyestuff of the present invention is wherein at least one of $B_1$ and $B_2$ is

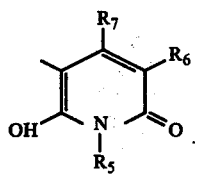

Another preferred embodiment of the water soluble trisazo dyestuff is wherein $B_1$, $B_2$ or both is

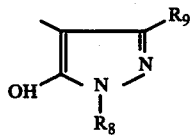

Another preferred embodiment of the water soluble trisazo dyestuff is wherein $B_1$, $B_2$ or both is

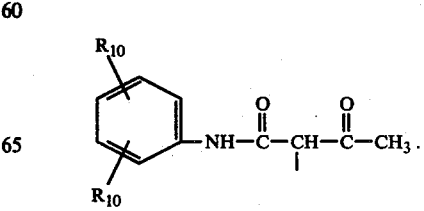

Another preferred embodiment of the water soluble trisazo dyestuff is wherein $B_1$, $B_2$ or both is

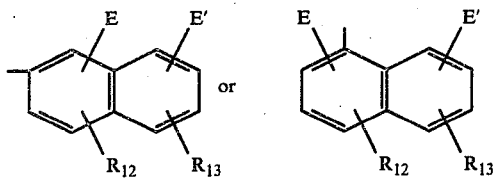

Another preferred embodiment of the water soluble trisazo dyestuff is wherein $B_1$, $B_2$ or both is

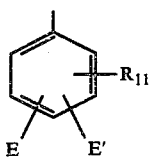

The divalent radicals M of the formula IV are derived from coupling components of the formula V $$M - NH_2 \qquad \qquad V$$

of the aromatic series which contain a diazotisable amino group and which can additionally carry other substituents which are customary in dyestuff chemistry.

In particular, the radicals M are derived from diazotisable coupling components M-NH$_2$ (V) of the aminobenzene series of the formula Vc

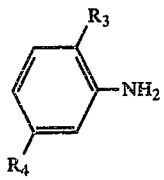

In preferred diazotisable coupling components of the aminobenzene series of the formula Vc, the substituent $R_3$ represents H, chlorine, alkyl having 1–2 C atoms, or alkoxy having 1–2 C atoms and the substituent $R_4$ represents H, chlorine, alkyl having 1–2 C atoms, hydroxyl, alkoxy having 1–2 C atoms, acylamino having 1–2 C atoms in the acyl radical, benzoylamino, oxalylamino or carboxyalkylamino, sulphoalkylamino or oxyalkylamino having in each case 1–2 C atoms in the alkyl radical.

The radicals $B_1$ and $B_2$ of a coupling component which are present in the dyestuffs according to the invention can be derived from the benzene, naphthalene, 6-hydroxy-2-pyridone, pyrazolone, acetoacetic acid arylamide, dihydroxyquinoline or 2,6-diaminopyridine series.

If the coupling components $B_1$ and/or $B_2$ are derived from the benzene or naphthalene series, $B_1$ and/or $B_2$ denote a phenyl radical or an α-naphthyl or β-naphthyl radical which is monosubstituted or disubstituted by amino and/or hydroxyl, and amino groups can also be monosubstituted or disubstituted by alkyl having 1 ∝ 4 C atoms or monosubstituted by aryl or aroyl having 6–12 C atoms, acyl having 2–5 C. atoms, carboxyalkyl or sulphoalkyl or hydroxyalkyl, in each case having especially 1 or 2 C atoms in the alkyl radical, or disubstituted by aryl having 6–12 C atoms or acyl having 2–5 C atoms and alkyl having 1–C atoms, and the phenyl or naphthyl radical can, in addition, also be monosubstituted or disubstituted by alkyl having 1–4 C atoms, alkoxy having 1–4 C atoms, carboxyl, sulpho, chlorine, bromine, nitro or alkoxycarbonyl having 1-C. atoms in the alkoxy radical. In a preferred group of dyestuffs according to the invention, $B_1$ and/or $B_2$ represent a phenyl radical which is monosubstituted or disubstituted by amino and/or hydroxyl, it being possible for amino groups to carry a sulphoethyl, sulphomethyl, carboxymethyl, carboxyethyl, hydroxymethyl, hydroxyethyl, acetyl, benzoyl, phenyl or tolyl substituent or one or two methyl or ethyl substituents and for the phenyl radical, in addition, to be monosubstituted by alkyl having 1–2 C atoms, alkoxy having 1–2 C atoms, carboxyl, sulpho, chlorine or nitro. A further preferred group of dyestuffs according to the invention contains, for $B_1$ and/or $B_2$, an α-naphthyl or β-naphthyl radical which is monosubstituted or disubstituted by amino and/or hydroxyl, it being possible for amino groups to carry a sulphoethyl, sulphomethyl, carboxymethyl, carboxyethyl, hydroxymethyl, hydroxyethyl, acetyl, benzoyl, phenyl or tolyl substituent or one or two methyl or ethyl substituents and for the naphthyl radical, in addition, to be monosubstituted by sulpho, carboxyl or chlorine or disubstituted by —SO$_3$H.

If the coupling components $B_1$ and/or $B_2$ which are present in the dyestuffs according to the invention are derived from the 6-hydroxypyridone series, preferred dyestuffs are those in which $B_1$ and/or $B_2$ is a radical of the formula VI

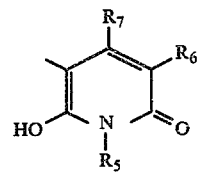

wherein $R_5$ denotes H or alkyl having 1–8 C atoms, $R_6$ denotes CN, COOH, —CONH$_2$ or —SO$_3$H and $R_7$ denotes H or alkyl having 1–4 C atoms.

The dyestuffs according to the invention in which $B_1$ and/or $B_2$ is a radical of the abovementioned formula wherein $R_5$ denotes hydrogen or methyl and $R_6$ denotes —CN or —SO$_3$H, are particularly valuable in this series.

If the radicals of the coupling components $B_1$ and/or $B_2$ in the dyestuffs according to the invention are derived from the pyrazolone series, they have the formula VII

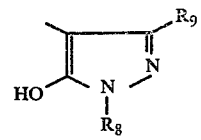

wherein $R_8$ denotes hydrogen or a phenyl radical which is optionally monosubstituted or disubstituted by methyl, nitro, chlorine and/or sulpho, and $R_9$ denotes a methyl group, a carboxyl group or an alkoxycarbonyl group having 2–5 C atoms.

If the radicals $B_1$ and/or $B_2$ of the coupling component in the dyestuffs according to the invention are derived from the series of the acetoacetoarylamides, they correspond to the formula VIII

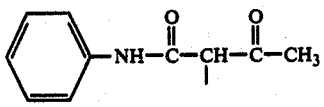

VIII or to a tautomeric form thereof wherein the phenyl nucleus can, in addition, be monosubstituted or disubstituted by methyl, methoxy, chlorine, —COOH or —SO$_3$H and, in addition, can have a methyl or methoxy group as a third substituent.

The radical of a coupling component B$_1$ and/or B$_2$ in the dyestuffs according to the invention can also be a 2,4-dihydroxy-3-quinolyl or 2,6-diamino-5-pyridyl radical.

The divalent radical of 2-phenylbenzimidazole, 2-phenylbenzoxazole or 2-phenylbenzthiazole which is present as the middle component in the dyestuffs according to the invention can be linked, via the azo bridge, to the coupling component B$_1$ either by means of the non-fused 2-phenyl nucleus (nucleus I) or by means of the fused phenyl nucleus (nucleus II).

Accordingly, mixtures of dyestuffs which are isomeric with one another in respect of the incorporation of the heterocyclic middle component are also to be regarded as dyestuffs according to the invention within the meaning of the present invention.

The azo bridge which is linked to the nucleus II of the benzimidazole, benzoxazole or benzthiazole system can be in the 5-position or the 6-position, which is intended to be indicated in the general formula by the bond line between the 5- and 6-positions.

The nuclei I and II of the heterocyclic middle component can be substituted by one or two identical or different substituents of the group alkyl and/or alkoxy, having in each case 1 or 2 C atoms, and/or halogen. Preferred dyestuffs according to the invention are those in which the nuclei I and/or II are substituted by a methyl group or chlorine. Dyestuffs according to the invention which are particularly preferred are those in which the heterocyclic middle component is a divalent radical of 2-phenylbenzimidazole.

The dyestuffs according to the invention are present, in particular, in the form of their sodium salts. Dyestuffs which contain 2–4 acid groups are particularly valuable. Acid groups in this sense are the carboxyl group and the sulphonic acid group, which are capable of forming salts.

The dyestuffs according to the invention, of the general formula I

B$_1$-N=N-Z-N=N-M-N=N-B$_2$   I wherein Z denotes the radical

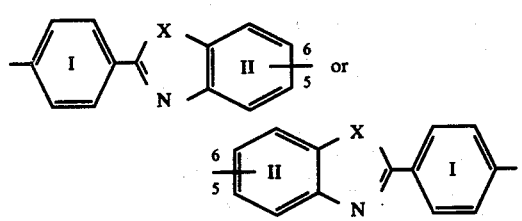

and B$_1$, B$_2$, X and M have the abovementioned meanings, can be manufactured by diazotising a diazotisable disazo dyestuff of the formula IX

B$_1$-N=N-Z-N=N-M-NH$_2$   IX and coupling the product with a coupling component of the formula X

B$_2$-H   X

The diazotised disazo dyestuff IX is coupled with the coupling component X in a manner which is in itself known, in an aqueous medium which can also contain water-miscible organic solvents, for example methanol or ethanol, and known coupling accelerators, such as urea, pyridine or thiourea, at temperatures of −10° to +30° C., preferably 0°–20° C., and within a pH range of 4 to 12, preferably 7 to 10.

The diazotisable disazo dyestuff of the formula IX which is required can be obtained by tetrazotising a heterocyclic diamine of the formula XI

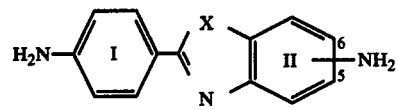

XI and coupling the product on one side with a coupling component of the formula XII

B$_1$-H   XII to give the diazotised monoazo dyestuff of the formula XIII

B$_1$-N=N-Z-N=N$^\oplus$]y$^\ominus$   XIII wherein y$^\ominus$ represents an anion, preferably the anion of a mineral acid, for example hydrochloric acid or sulphuric acid.

The diazotised monoazo dyestuff XIII obtained in this way is then combined with a diazotisable coupling component of the formula V

M-NH$_2$   V to give the disazo dyestuff IX.

Diazotisable disazo dyestuffs of the formula IX which are suitable for the manufacture of the dyestuffs, according to the invention, of the formula I can, furthermore, also be manufactured by tetrazotising heterocyclic diamines of the general formula XI and first coupling the product on one side with a diazotisable coupling component of the formula V

M-NH$_2$   V to give the diazotised monoazo dyestuff of the formula XIV y$^\ominus$[$^\oplus$N=N-Z-N=N-M-NH$_2$   XIV wherein y$^\ominus$, Z and M-NH$_2$ have the meaning already mentioned.

The diazotised monoazo dyestuff XIV is then combined with the coupling component B$_1$-H (XII), the required diazotisable disazo dyestuff of the formula IX being obtained. The heterocyclic diamine XI is tetrazotised in a manner which is in itself known, for example by the action of nitrous acid in an acid, aqueous medium at temperatures of −10° to +30° C. The subsequent coupling on one side with the coupling component B₁-H (XII) to give the diazotised monoazo dyestuff XIII or with the diazotisable coupling component M-NH₂ (V) to give the diazotised monoazo dyestuff XIV is carried out in an aqueous medium at temperatures of −10° to +30° C. and at pH values of 3 to 12, preferably 4 to 9.

Water-miscible solvents, for example alcohols, can, if appropriate, be present in the aqueous medium. Coupling accelerators which are in themselves known, for example pyridine, urea or thiourea, can be present in the coupling reactions.

The new trisazo dyestuffs of the general formula I can, furthermore, also be manufactured by tetrazotising a heterocyclic diamine of the formula XI and coupling the product, in the manner already described, with a diazotisable coupling component of the formula V

M-NH₂   V to give the diazotised monoazo dyestuff of the general formula XIV y<sup>⊖</sup>[⊕N=N-Z-N]P=N-M-NH₂   XIV wherein y<sup>⊖</sup>, Z and M-NH₂ have the meaning already mentioned.

The diazotisable amino group in the radical M-NH₂, of the diazotised monoazo dyestuff XIV is then diazotised further and the resulting tetrazotised monoazo dyestuff of the general formula XV

[⊕N=N-Z-N=N-M-N=N⊕]2 y<sup>⊖</sup>   XV is coupled with 1 mol of each of the coupling components of the formulae B₁-H (XII) and B₂-H (X), wherein B₁ and B₂ are the same or different and have the same meaning as defined above to give the trisazo dyestuff, according to the invention, of the formula I.

This process makes it possible, by employing two different coupling components B₁H and B₂H, to obtain mixtures of dyestuffs according to the invention which differ in respect of the radicals represented by B₁ and B₂. If, for example, two special coupling components B₁H and B₂H are reacted simultaneously with a tetrazo compound XV, mixtures of dyestuffs according to the invention of the general formulae

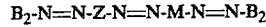

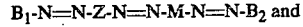

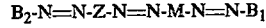

can be obtained. Such mixtures of dyestuffs according to the invention also form part of the subject of the invention and have a high technological value.

Valuable mixtures of the dyestuffs of the present invention are also obtained if mixtures of several, preferably two, different couplings components coming within the above-stated definition are used for B₁-H and/or B₂H.

In this manufacturing process, the heterocyclic diamine of the formula XI is also tetrazotised in a manner which is in itself known, for example as indicated above.

The subsequent one-sided coupling with the diazotisable coupling component of the formula M-NH₂ (V) is carried out in an aqueous medium at pH values of 3 to 12, preferably 4 to 9. The further diazotisation of the diazotised monoazo dyestuff XIV to give the tetrazotised monoazo dyestuff XV is also carried out in an aqueous medium at pH 0-3, while the coupling of XV with two identical or different mols of B₁H (XII) or B₂-H (X) to give the final dyestuff I is carried out at pH values between 4 and 12, preferably 7 to 10.

The following are examples of heterocyclic diamines of the formula XI

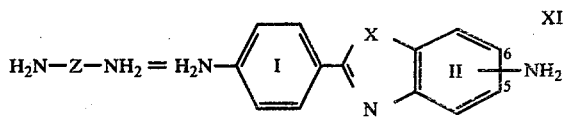

which are suitable for the manufacture of the trisazo dyestuffs, according to the invention, of the general formula I: 2-(4'-aminophenyl)-5- (or 6)-amino-benzimidazole, 1-methyl-2-(4'-aminophenyl)-6-amino-benzimidazole, 1-methyl-2-(4'-aminophenyl)-5-amino-benzimidazole, 1-ethyl-2-(4'-aminophenyl)-5-amino-benzimidazole, 1-propyl-2-(4'-aminophenyl)-5-amino-benzimidazole, 1-butyl-2-(4'-aminophenyl)-5-amino-benzimidazole, 1-phenyl-2-(4'-aminophenyl)-5-amino-benzimidazole, 1-benzyl-2-(4'-aminophenyl)-5-amino-benzimidazole, 2-(4'-aminophenyl)-4-methyl-5-amino-benzimidazole, (identical with 2-(4'-aminophenyl)-6-amino-7-methyl-benzimidazole), 2-(4'-aminophenyl)-5-amino-6-methyl-benzimidazole (identical with 2-(4'-aminophenyl)-5-methyl-6-amino-benzimidazole), 2-(4'-aminophenyl)-5-amino-6-chloro-benzimidazole (identical with 2-(4'-aminophenyl)-5-chloro-6-amino-benzimidazole), 2-(4'-aminophenyl)-5-amino-7-chloro-benzimidazole (identical with 2-(4'-aminophenyl)-4-chloro-6-amino-benzimidazole), 2-(4'-aminophenyl)-5-amino-6-ethoxy-benzimidazole) (identical with 2-(4'-aminophenyl)-5-ethoxy-6-amino-benzimidazole), 2-(2'-methyl-4'-aminophenyl)-5- (or 6)-amino-benzimidazole, 2-(3'-methyl-4'-aminophenyl)-5- (or 6)-amino-benzimidazole, 2-(2'-chloro-4'-aminophenyl)-5- (or 6)-amino-benzimidazole, 2-(3'-chloro-4'-aminophenyl)-5- (or 6)-amino-benzimidazole, 2-(4'-aminophenyl)-5-amino-benzoxazole, 2-(4'-aminophenyl)-6-amino-benzoxazole, 2-(4'-amino-2'-chloro-phenyl)-5-amino-benzoxazole, 2-(4'-aminophenyl)-4-methyl-5-amino-benzoxazole, 2-(4'-aminophenyl)-5-amino-benzthiazole, 2-(4'-aminophenyl)-6-amino-benzthiazole, 2-(4'-aminophenyl)-6-methyl-5-amino-benzthiazole, 2-(4'-aminophenyl)-5-methyl-6-amino-benzthiazole and 2-(4'-aminophenyl)-5-chloro-6-amino-benzthiazole.

Tautomerism is possible in the case of the benzimidazoles having X = —NH—, so that, for example, it is not possible to distinguish between the 5-position and the 6-position. If further substituents are additionally present in the nucleus II, two different possible methods of numbering result, and this has been taken into consideration in the above text.

Furthermore, all the heterocyclic diamines which can be obtained in accordance with the manufacturing methods indicated in U.S. Pat. No. 4,033,945, column 4, line 35 through column 7, line 25, are suitable for the manufacture of trisazo dyestuffs according to the invention.

The heterocyclic diamines XI have an unsymmetrical structure. When a tetrazotised, heterocyclic diamine XI is coupled with a coupling component B₁-H (XII) or with a diazotisable coupling component M-NH₂ (V), two possibilities can arise, depending on which side of the tetrazotised, heterocyclic diamine couples first. In conformity with these possibilities, the following two structures are given for the final dyestuffs:

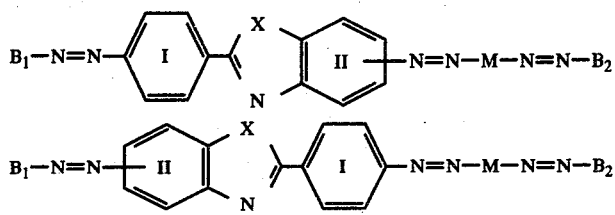

It can be assumed that the trisazo dyestuffs (I) which can be manufactured in the said manner represent mixtures of the two components (Ia) and (Ib). The following are examples of suitable diazotisable coupling components of the formula M-NH$_2$ (V): 3-methylaniline, 2,5-dimethylaniline, 2,5-dimethoxyaniline, 2-methoxy-5-methylaniline, 2-ethoxy-5-methylaniline, 3-aminophenol, 3-methoxyaniline, 3-aminoformanilide, 1-amino-3-acetylaminobenzene, 1-amino-3-acetylamino-6-methylbenzene, 1-amino-3-acetylamino-6-ethylbenzene, 1-amino-3-benzoylamino-benzene, 1-amino-3-propionylamino-benzene, 1-amino-3-butyrylamino-benzene, 1-amino-3-oxalylaminobenzene, 1-amino-3-oxalylamino-6-methylbenzene, 1-amino-3-acetylamino-6-methoxybenzene, 1-amino-3-acetylamino-6-ethoxybenzene, 1-amino-3-carboxymethylaminobenzene, 1-amino-3-carboxymethylamino-6-methylbenzene, 1-amino-3-carboxyethylaminobenzene, 1-amino-3-oxyethylaminobenzene, 1-amino-3-sulphomethylaminobenzene and 1-amino-3-sulphoethylaminobenzene.

In the manufacture of the dyestuffs I according to the invention, the diazotisable coupling components M-NH$_2$ (V), in particular the coupling components of the aminobenzene series of the formula Vc, can also be employed in the form of their arylamino-methanesulphonic acids, which can be manufactured by reaction with formaldehyde and sodium bisulphite, or in the form of their arylaminosulphuric acids, which can be obtained by reaction with halogenosulphonic acids (compare Houben-Weyl, "Methoden der Organischen Chemie" ("Methods of Organic Chemistry"), volume X/3 (1965), pages 241–243. The coupling product can subsequently be converted by acid or alkaline hydrolysis into the diazotisable disazo dyestuff having a free amino group of the formula IX. The following are examples of coupling components of the aminobenzene series of the formula (Vc) which are preferably employed in the form of their arylamino-methanesulphonic acids, which can be manufactured by reaction with formaldehyde and sodium bisulphite, or in the form of their arylaminosulphuric acids, which can be obtained by reaction with halogenosulphonic acids: aniline, 2-aminotoluene, 3-aminotoluene, 2-amino-1-ethylbenzene, 3-amino-1-ethylbenzene, 2-methoxyaniline, 2-ethoxyaniline, 3-methoxyaniline, 3-ethoxyaniline, 2-chloroaniline and 3-chloroaniline.

The following are examples of coupling components of the formula B$_1$-H (XII) and/or B$_2$-H (X) which are suitable for the manufacture of the dyestuffs according to the invention: phenol, 2-methylphenol, 4-methylphenol, 3-chlorophenol, 3-methoxyphenol, 2-hydroxybenzenesulphonic acid, 3-hydroxybenzenesulphonic acid, 1,3-dihydroxybenzene, 1,3-dihydroxy-2-chlorobenzene, 1,3-dihydroxy-4-chlorobenzene, 1,3-dihydroxy-5-methylbenzene, 1,3-dihydroxy-4-hexylbenzene, 1,3-dihydroxybenzene-4-sulphonic acid, 1,3-dihydroxybenzene-5-sulphonic acid, 1-amino-3-hydroxybenzene, 1-amino-3-hydroxy-4-chlorobenzene, 1-(phenylamino)-3-hydroxybenzene, 1-(2'-methylphenylamino)-3-hydroxybenzene, 3-aminophenol-4-sulphonic acid, 3-aminophenol-6-sulphonic acid, 1,3-diaminobenzene, 1,3-diamino-4-methylbenzene, 1,3-diamino-4-ethylbenzene, 1,3-diamino-4-n-propylbenzene, 1,3-diamino-4-n-butylbenzene, 1,3-diamino-4-chlorobenzene, 1,3-diamino-4-bromobenzene, 1,3-diamino-4-methoxybenzene, 1,3-diamino-4-Ethoxybenzene, 1,3-diamino-4-nitrobenzene, 1-amino-3-dimethylaminobenzene, 1,3-diamino-4-n-propoxybenzene, 1,3-diamino-4-isopropoxybenzene, 1-amino-3-diethylaminobenzene, 1-acetylamino-3-diethylaminobenzene, 1-amino-3-carboxymethylaminobenzene, 1-amino-3-carboxyethylaminobenzene, 1-amino-3-sulphomethylaminobenzene, 1-amino-3-oxyethylaminobenzene, 1-amino-3-sulphoethylamino-benzene, 1,3-diaminobenzene-4-sulphonic acid, 2-hydroxybenzoic acid, 5-chloro-2-hydroxybenzoic acid, 2-hydroxy-3-methylbenzoic acid, 2-hydroxy-4-methyl-benzoic acid, 2-hydroxy-5-sulpho-benzoic acid, 2-hydroxybenzoic acid ethyl ester, 1-hydroxynaphthalene, 1,6-dihydroxynaphthalene, 1-hydroxynaphthalene-3-sulphonic acid, 1-hydroxynaphthalene-4-sulphonic acid, 1-hydroxynaphthalene-3,6-disulphonic acid, 1-hydroxynaphthalene-5-, -6- and -7-sulphonic acid, 2-hydroxynaphthalene, 2-hydroxynaphthalene-3-carboxylic acid, 2-hydroxynaphthalene-6-, -7- and -8-sulphonic acid, 2-hydroxynaphthalene-3,6-disulphonic acid, 2-hydroxynaphthalene-6,8-disulphonic acid, 1-aminonaphthalene, 1-aminonaphthalene-4-, -5-, -6- and -7-sulphonic acid, 1-carboxymethylamino-naphthalene-6-sulphonic acid, 1-carboxymethylamino-naphthalene-7-sulphonic acid, 1-hydroxyethylamino-naphthalene-6-sulphonic acid, 1-hydroxyethylaminonaphthalene-7-sulphonic acid, 1-phenylamino-naphthalene-8-sulphonic acid, 1-aminonaphthalene-3,6-disulphonic acid, 1-aminonaphthalene-5,7-disulphonic acid, 1-aminonaphthalene-3,7-disulphonic acid, 2-aminonaphthalene-5-sulphonic acid, 2-aminonaphthalene-6-sulphonic acid, 2-aminonaphthalene-7-sulphonic acid, 2-aminonaphthalene-8-sulphonic acid, 2-aminonaphthalene-3,6-disulphonic acid, 2-aminonaphthalene-4,8-disulphonic acid, 2-aminonaphthalene-6,8-disulphonic acid, 2-aminonaphthalene-5,7-disulphonic acid, 1-amino-7-hydroxynaphthalene, 2-amino-7-hydroxynaphthalene, 1-amino-5-hydroxynaphthalene-7-sulphonic acid, 1-amino-7-hydroxynaphthalene-5-sulphonic acid, 1-amino-8-hydroxynaphthalene-4-sulphonic acid, 1-amino-8-hydroxynaphthalene-2,4-disulphonic acid, 1-amino-8-hydroxynaphthalene-3,6-disulphonic acid, 1-amino-8-hydroxynaphthalene-4,6-disulphonic acid, 2-amino-5-hydroxy-naphthalene-7-sulphonic acid, 2-amino-8-hydroxynaphthalene-6-sulphonic acid, 2-amino-8-hydroxynaphthalene-3,6-disulphonic acid, 2-phenylamino-8-hydroxynaphthalene-6-sulphonic acid, 2-phenylamino-5-hydroxynaphthalene-7-sulphonic acid, 2-carboxymethylamino-5-hydroxynaphthalene-7-sulphonic acid, 2-benzoylamino-5-hydroxynaphthalene-7-sulphonic acid, 2-acetylamino-5-hydroxynaphthalene-7-sulphonic acid, 1-acetylamino-8-hydroxynaphthalene-3,6-disulphonic acid, 1-benzoylamino-8-hydroxynaphthalene-3,6-disulphonic acid, 2-acetylamino-8-hydroxynaphthalene-6-sulphonic acid, 2-carboxymethylamino-8-hydroxynaphthalene-6-sulphonic acid, 2-methylamino-8-hydroxynaphthalene-6-sulphonic acid, 2-dimethylamino-8-hydroxynaphthalene-6-sulphonic acid, 2-oxyethylamino-8-hydroxynaphthalene-6-sulphonic acid, acetoacetic acid anilide, acetoacetic acid-o-, -m- and -p-toluidide, acetoacetic acid-2-sulphoanilide, acetoacetic acid-3-sulphoanilide, acetoacetic acid-4-sulphoanilide, acetoacetic acid-4-carboxyanilide, acetoacetic acid-2-methoxyanilide, acetoacetic acid-4-methoxyanilide, acetoacetic acid-2-methyl-4-chloroanilide, acetoacetic acid-2-chloroanilide, acetoacetic acid-4-chloroanilide, acetoacetic acid-2,5-dimethoxy-4-chloroanilide, 3-methyl-5-pyrazolone, 1-phenyl- 3-methyl-5-pyrazolone, 1-(2'-sulphophenyl)-3-methyl-5-pyrazolone, 1-(3'-sulphophenyl)-3-methyl-5-pyrazolone, 1-(4'-sulphophenyl)-3-methyl-5-pyrazolone, 1-phenyl-5-pyrazolone-3-carboxylic acid, 1-(4'-sulphophenyl)-5-pyrazolone-3-carboxylic acid, 1-(3'-nitro-phenyl)-3-methyl-5-pyrazolone, 1-(4'-methyl-phenyl)-3-methyl-5-pyrazolone, 1-(4'-methyl-phenyl)-3-butoxycarbonyl-5-pyrazolone, 1-(2',5'-dichloro-4'-sulphophenyl)-3-methyl-5-pyrazolone, 1-(3'-sulpho-phenyl)-3-ethoxycarbonyl-5-pyrazolone, 1-(6'-chloro-3'-sulpho-phenyl)-3-methyl-5-pyrazolone, 1-(2'-chloro-4'-sulpho-phenyl)-3-methyl-5-pyrazolone, 1-(4'-sulpho-2'-methylphenyl)-3-methyl-5-pyrazolone, 3-cyano-6-hydroxy-2-pyridone, 4-methyl-3-cyano-6-hydroxy-2-pyridone, 4-methyl-3-carboxy-6-hydroxy-2-pyridone, 4-methyl-6-hydroxy-2-pyridone-3-carboxylic acid amide, 1,4-dimethyl-3-cyano-6-hydroxy-2-pyridone, 1-(n)-butyl-3-cyano-4-methyl-6-hydroxy-2-pyridone, 1-(2-ethylhexyl)-3-cyano-4-methyl-6-hydroxy-2-pyridone, 1-ethyl-3-cyano-4-butyl-6-hydroxy-2-pyridone, 1-ethyl-3-carboxy-4-methyl-6-hydroxy-2-pyridone, 1-ethyl-3-sulpho-4-methyl-6-hydroxy-2-pyridone, 1,4-dimethyl-3-sulpho-6-hydroxy-2-pyridone, 4-methyl-3-sulpho-6-hydroxy-2-pyridone, 1-isopropyl-3-amidocarbonyl-4-methyl-6-hydroxy-2-pyridone, 2,4-dihydroxyquinoline and 2,6-diamino-3-cyano-4-methylpyridine.

The trisazo dyestuffs according to the invention have a high tinctorial strength. They are outstandingly suitable as direct dyestuffs for dyeing and printing natural or synthetic fibre materials which contain hydroxyl groups or which contain nitrogen, especially cotton and regenerated cellulose as well as wool, wool/cotton union, silk, polyamide, leather and paper. Dyeing and printing are carried out by the customary processes. Orange, brown, red, blue, green and black dyeings of good fastness properties are obtained on the said substrates.

The new dyestuffs are especially distinguished by good fastness to wet processing, for example fastness to water, washing at 40° C. and washing at 60° C., and by good fastness to perspiration (alkaline and acid) and fastness to acids.

If X is

especially

the new dyestuffs are absorbed particularly exhaustively onto the fibre materials to be dyed, when dyeing by the exhaustion process, so that a nearly clear residual liquor is obtained.

The new dyestuffs are particularly suitable for dyeing fibers composed of cotton and regenerated cellulose and for dyeing polyamide, leather and paper.

In the examples which follow, parts denote parts by weight, percentages denote percentages by weight and the temperatures are quoted in degrees centigrade.

EXAMPLE 1

22.4 parts of 2-[4'-aminophenyl]-5 (or 6)-amino benzimidazole in a mixture of 200 parts of water and 50 parts of 30% strength aqueous hydrochloric acid are tetrazotised with a solution of 13.8 parts of sodium nitrite in 50 parts of water, while adding ice, at 0°-5° C. After the sodium nitrite solution has been added, stirring is continued for 1 hour at 0°-5° C. and excess nitrous acid is removed with amidosulphonic acid. A solution of 15.6 parts of 2-hydroxybenzoic acid and 40 parts of sodium carbonate in 150 parts of water are then added rapidly to the yellow solution of the tetrazo component. The one-sided coupling is complete after stirring for 2-3 hours at pH 8-10. The suspension of the diazotised monoazo dyestuff is then adjusted to pH 3 with 80 parts of 30% strength hydrochloric acid and a solution of 12.1 parts of 2,5-dimethylaniline in 100 parts of water and 10 parts of 30% strength hydrochloric acid is then added. The pH value of the coupling mixture is raised to 4.5-5 by adding a solution of 14 parts of sodium acetate in 100 parts of water. Stirring is continued for 12 hours at 5°-10° C. in order to complete the coupling.

The suspension of the brown disazo dyestuff is then adjusted to pH 1-2 with 45 parts of 30% strength hydrochloric acid and is diazotised further at 0°-5° C. with a solution of 7.6 parts of sodium nitrite in 30 parts of water. After stirring for a further 2 hours, excess nitrous acid is removed with amidosulphonic acid and the suspension of the diazo component obtained in this way is then run into a solution of 23.9 parts of 2-amino-8-hydroxynaphthalene-6-sulphonic acid, 4 parts of sodium hydroxide and 50 parts of sodium carbonate in 250 parts of water. The dyestuff of the structure

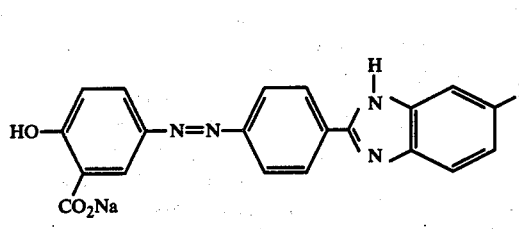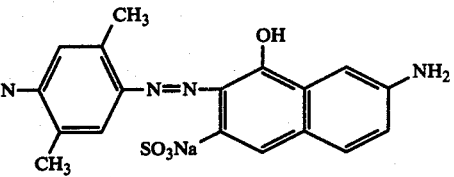

which separates out at pH 7.5 is filtered off and dried.

A solution of 0.2 part of sodium carbonate and 4 parts of sodium sulphate decahydrate in 200 parts of water is made up at 40° C. in a dye beaker which is placed in a bath which can be heated.

0.2 part of the dyestuff which has been prepared is then added. 10 g of a cotton fabric are kept continuously agitated in the ready-to-use dye liquor, the temperature is raised to 95° C. and dyeing is carried out for a further 45 minutes at this temperature. The dyed cotton fabric is then withdrawn from the residual liquor which retains ony a slight coloration and the liquor still adhering is removed by wringing-out. The dyed material is then rinsed with cold water and dried at 60° C.

A brown dyeing with a good depth of colour and with good fastness properties, especially good fastness to washing, water and perspiration, is obtained.

Brown trisazo dyestuffs which are distinguished by a high tinctorial strength and by good fastness properties, especially by good fastness to washing, water and perspiration, are also obtained if 2-hydroxy-3-methyl-benzoic acid is employed instead of 2-hydroxybenzoic acid or if the diazotisable coupling component 3-methylaniline, 3-methoxyaniline, 2-methoxy-5-methylaniline, 2-methoxy-5-chloroaniline, 2-ethoxy-5-methylaniline, 2,5-dimethoxyaniline, 1-amino-3-formanilide, 1-amino-3-acetylaminobenzene, 1-amino-3-acetylamino-6-methylbenzene, 1-amino-3-oxalylaminobenzene, 1-amino-3-oxalylamino-6-methylbenzene, 1-amino-3-acetylamino-6-methoxybenzene, 1-amino-3-acetylamino-6-ethoxybenzene or 3-aminophenol are employed instead of 2,5-dimethylaniline or if the coupling component 2-methylamino-8-hydroxynaphthalene-6-sulphonic acid, 2-dimethylamino-8-hydroxynaphthalene-6-sulphonic acid, 2-phenylamino-8-hydroxynaphthalene-6-sulphonic acid, 2-acetylamino-8-hydroxynaphthalene-6-sulphonic acid, 2-carboxymethylamino-8-hydroxynaphthalene-6-sulphonic acid, 2-carboxyethylamino-8-hydroxynaphthalene-6-sulphonic acid, 2-hydroxyethylamino-8-hydroxynaphthalene-6-sulphonic acid, 2-amino-8-hydroxynaphthalene-3,6-disulphonic acid, 2-amino-5-hydroxynaphthalene-7-sulphonic acid, 2-acetylamino-5-hydroxynaphthalene-7-sulphonic acid, 2-carboxymethylamino-5-hydroxynaphthalene-7-sulphonic acid, 2-sulphomethylamino-8-hydroxynaphthalene-6-sulphonic acid, 2-hydroxyethylamino-5-hydroxynaphthalene-7-sulphonic acid or 2-sulphomethylamino-5-hydroxynaphthalene-7-sulphonic acid are employed instead of 2-amino-8-hydroxynaphthalene-6-sulphonic acid.

EXAMPLE 2

22.4 parts of 2-[4'-aminophenyl]-5 (or 6)-amino benzimidazole in a mixture of 200 parts of water and 50 parts of 30% strength aqueous hydrochloric acid are tetrazotised with a solution of 13.8 parts of sodium nitrite in 50 parts of water, while adding ice, at 0°-5° C. After the sodium nitrite solution has been added, stirring is continued for about 1 hour at 0°-5° C. and the excess nitrous acid is then removed with amidosulphonic acid. A solution of 13.9 parts of 2-methoxy-5-methylaniline in 100 parts of water and 10 parts of 30% strength hydrochloric acid is then run, at 0°-5° C., into the yellow solution of the tetrazo compound. The pH value is then adjusted to 4.5 by sprinkling in 20 parts of sodium acetate and stirring is continued for 3 hours in order to complete the one-sided coupling. The pH of the mixture of the diazotised monoazo dyestuff is then adjusted to 1.5 with 25 parts of 30% strength aqueous hydrochloric acid and a solution of 7.6 parts of sodium nitrite in 30 parts of water is added at 0°-5° C. Stirring is continued for two hours in order to complete the diazotisation and excess nitrous acid is removed with amidosulphonic acid. The red-brown solution of the tetrazotised monoazo dyestuff thus obtained is then added at 0°-5° C. to a solution of 65 parts of 1-amino-8-hydroxynaphthalene-3,6-disulphonic acid, 8 parts of sodium hydroxide and 42.5 parts of sodium carbonate in 300 parts of water and stirring is continued for 3 hours at pH 8-9. The dyestuff of the structure

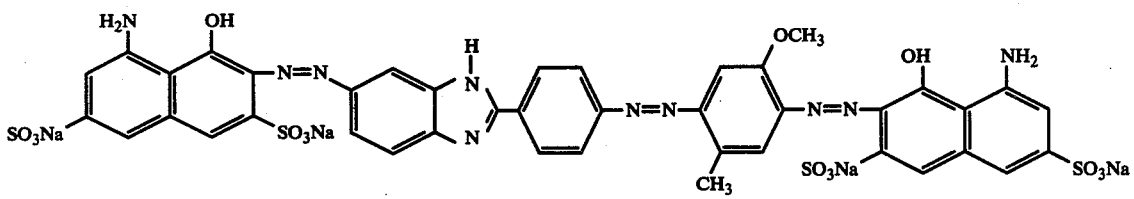

which has separated out with the aid of 100 parts of sodium chloride at pH 5 is filtered off and dried.

The trisazo dyestuff dyes cotton in a greenish-tinged blue shade. The dyeings have a good depth of colour and good fastness properties, in particular very good fastness to washing, water and perspiration.

Blue trisazo dyestuffs which are distinguished by high tinctorial strength and by good fastness properties, in particular by good fastness to washing, water and perspiration, are also obtained if the diazotisable coupling components 3-methylaniline, 2,5-dimethylaniline, 3-methoxyaniline, 3-aminophenol, 2-methoxy-5-chloroaniline, 2-ethoxy-5-methylaniline, 2,5-dimethoxyaniline, 1-amino-3-formanilide, 1a-amino-3-acetylaminobenzene, 1-amino-3-acetylamino-6-methylbenzene, 1-amino-3-oxalylaminobenzene, 1-amino-3- oxalylamino-6-methylbenzene, 1-amino-3-acetylamino-6-methoxybenzene or 1-amino-3-actylamino-6-ethoxybenzene are employed instead of 2-methoxy-5-methylaniline or if the coupling components 1,8-dihydroxynaphthalene-3,6-disulphonic acid, 1-amino-8-hydroxynaphthalene-2,4-disulphonic acid, 1-amino-8-hydroxynaphthalene-4,6-disulphonic acid, 1-amino-8-hydroxynaphthalene-4-sulphonic acid, 1-acetylamino-8-hydroxynaphthalene-3,6-disulphonic acid, 1-benzoylamino-8-hydroxynaphthalene-3,6-disulphonic acid or 2-amino-8-hydroxynaphthalene-3,6-disulphonic acid are employed instead of 1-amino-8-hydroxynaphthalene-3,6-disulphonic acid.

EXAMPLE 3

The tetrazotisation of 22.4 parts of 2-(4'-aminophenyl)-6-aminobenzimidazole, the one-sided coupling of the resulting tetrazo compound with 13.9 parts of 2-methoxy-5-methylaniline and the further diazotisation of the diazotised monoazo dyestuff to give the tetrazotised monoazo dyestuff of the formula

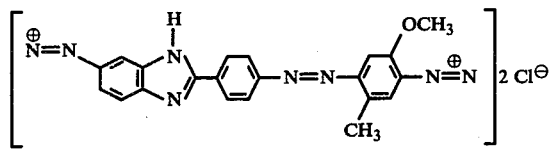

is carried out according to the instructions of Example 2.

The solution of the tetrazotised monoazo dyestuff thus prepared is then run, at 0°–5° C., into a solution of 51.6 parts of 1-(4'-sulphophenyl)-3-methyl-5-pyrazolone, 8 parts of sodium hydroxide and 42.5 parts of sodium carbonate in 300 parts of water and stirring is continued for 3 hours at pH 8-9. The dyestuff of the structure which has separated out at pH 7.5 is filtered off and dried.

The trisazo dyestuff dyes cotton in orange-red colour shades. The dyeings are distinguished by a good depth of colour and good fastness properties, in particular by good fastness to washing, water and perspiration.

Trisazo dyestuffs which dye cotton and viscose in orange-red colour shades are obtained if 3-methylaniline, 3-methoxyaniline, 2,5-dimethylaniline, 2-methoxy-5-chloroaniline, 2,5-dimethoxyaniline, 1-amino-3-formanilide, 1-amino-3-acetylaminobenzene, 1-amino-3-acetylamino-6-methylbenzene, 1-amino-3-oxalylaminobenzene, 1-amino-3-oxalylamino-6-methylbenzene, 3-aminophenol, 1-amino-3-acetylamino-6-methoxybenzene, 1-amino-3-acetylamino-6-ethoxybenzene or 2-ethoxy-5-methylaniline, are used as the diazotisable coupling component instead of 2-methoxy-5-methylaniline or if the coupling components 1-(2'-sulphophenyl)-3-methyl-5-pyrazolone, 1-(3'-sulphophenyl)-3-methyl-5-pyrazolone, 1-(2'-nitro-4'-sulphophenyl)-3-methyl-5-pyrazolone, 1-(4'-nitro-2'-sulphophenyl)-3-methyl-5-pyrazolone, 1-(2',5'-dichloro-4'-sulphophenyl)-3-methyl-5-pyrazolone, 1-(2'-methyl-6'-chloro-4'-sulphophenyl)-3-methyl-5-pyrazolone, 1-(2',4'-disulphophenyl)-3-methyl-5-pyrazolone, 1-(2',5'-disulphophenyl)-3-methyl-5-pyrazolone, 1-(4'-sulphophenyl)-5-pyrazolone-3-carboxylic acid methyl ester, 1-(4'-sulphophenyl)-5-pyrazolone-3-carboxylic acid ethyl ester, 1-(2'-sulphophenyl)-5-pyrazolone-3-carboxylic acid, 1-(3'-sulphophenyl)-5-pyrazolone-3-carboxylic acid, 1-(4'-sulphophenyl)-5-pyrazolone-3-carboxylic acid, 1-(2'-carboxyphenyl)-5-pyrazolone-3-carboxylic acid or 1-(2',5'-dichloro-4'-sulphophenyl)-5-pyrazolone-3-carboxylic acid are used instead of 1-(4'-sulphophenyl)-3-methyl-5-pyrazolone. The dyeings are also distinguished by a good depth of colour and good fastness properties, in particular by good fastness to water, washing and perspiration.

EXAMPLE 4

The tetrazotised monoazo dyestuff of the formula

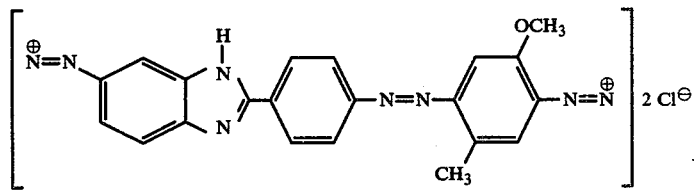

is prepared according to the instructions of Example 2.

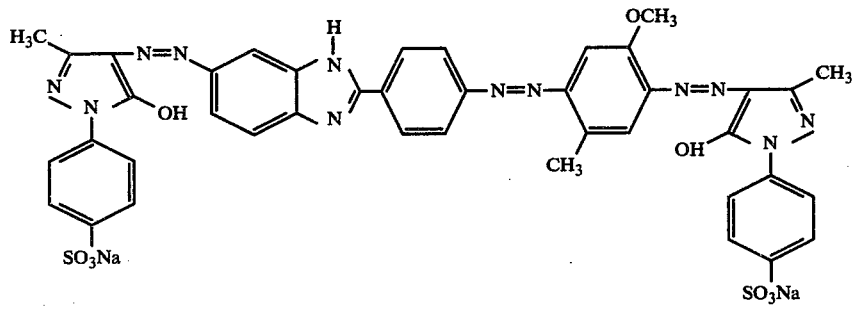

The solution of this tetrazo compound is then run, at 0°–5° C., into a solution of 44.6 parts of 1-aminonaphthalene-6-sulphonic acid, 8 parts of sodium hydroxide and 42.5 parts of sodium carbonate in 350 parts of water. Stirring is continued for 3–4 hours a pH 7.5–8.5. The trisazo dyestuff of the structure

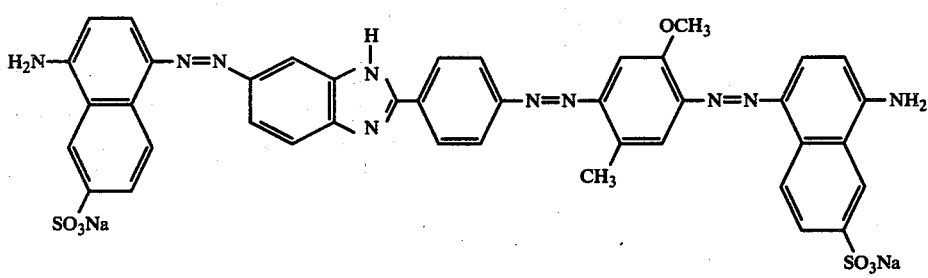

which has separated out at pH 5 is filtered off and dried. Brown dyeings of a good depth of colour and with good fastness properties, for example good fastness to water, washing and perspiration, are obtained on cotton or regenerated cellulose.

Brown trisazo dyestuffs which are also distinguished by a high tinctorial strength and good fastness to water, washing and perspiration, are obtained if the diazotisable coupling components 3-methylaniline, 3-methoxyaniline, 3-aminophenol, 2,5-dimethylaniline, 2-methoxy-5-chloroaniline, 2,5-dimethoxyaniline, 1-amino-3-formanilide, 1-amino-3-acetylaminobenzene, 1-amino-3-acetylamino-6-methylbenzene, 1-amino-3-oxalylaminobenzene, 1-amino-3-oxalylamino-6-methylbenzene, 1-amino-3-acetylamino-6-methoxybenzene, 1-amino-3-acetylamino-6-ethoxybenzene or 2-ethoxy-5-methylaniline are employed instead of 2-methoxy-5-methylaniline or if the coupling components 1-aminonaphthalene-7-sulphonic acid, the technical mixture of 1-aminonaphthalene-6-sulphonic acid and 1-aminonaphthalene-7-sulphonic acid, 1-aminonaphthalene-4-sulphonic acid, 2-aminonaphthalene-6-sulphonic acid, 1-phenylaminonaphthalene-8-sulphonic acid, 2-aminonaphthalene-3,6-disulphonic acid, 2-aminonaphthalene-6,8-disulphonic acid, 1-carboxymethylaminonaphthalene-6-sulphonic acid, 1-carboxymethylamino-naphthalene-7-sulphonic acid or the coupling components of the benzene series 1,3-dihydroxybenzene-4-sulphonic acid, 1,3-dihydroxybenzene-5-sulphonic acid, 3-aminophenol-4-sulphonic acid, 3-aminophenol-6-sulphonic acid, 1,3-diaminobenzene-4-sulphonic acid, 1-acetylamino-3-aminobenzene-4-sulphonic acid, 2,4-diaminotoluene-5-sulphonic acid, 2,6-diaminotoluene-4-sulphonic acid, 1,3-diaminobenzene-4,6-disulphonic acid, 3-carboxymethylaminophenol, 1-amino-3-carboxymethylaminobenzene, 1amino-3-carboxymethylaminobenzene, 1-amino-3-carboxymethylamino-6-methylbenzene, 1,3-biscarboxymethylaminobenzene, 1,3-biscarboxymethylamino-6-methylbenzene, 2-hydroxybenzoic acid, 2-hydroxybenzenesulphonic acid, 3-hydroxybenzene-sulphonic acid, 4-hydroxybenzene-sulphonic acid, 2-hydroxy-5-sulphobenzoic acid or 2-hydroxy-3-methylbenzoic acid are employed instead of 1-aminonaphthalene-6-sulphonic acid.

EXAMPLE 5

A solution of the tetrazotised monoazo dyestuff of the formula

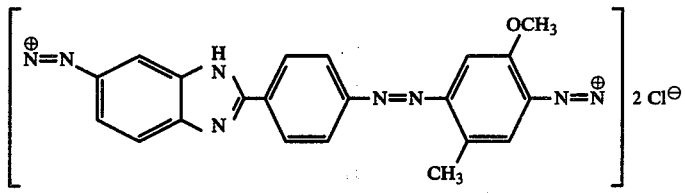

is prepared according to the instructions of Example 2 and is adjusted to pH 3 at 0°–5° C. with a solution of 7 parts of sodium acetate in 50 parts of water. A solution of 31.9 parts of 1-amino-8-hydroxynaphthalene-3,6-disulphonic acid, 4 parts of sodium hydroxide and 36 parts of sodium carbonate in 200 parts of water is then run in in the course of approximately 10 minutes. Stirring is continued for approximately 15 minutes at pH 7.5–8 until the one-sided coupling is complete and a solution of 23.9 parts of 2-amino-8-hydroxynaphthalene-6-sulphonic acid, 4 parts of sodium hydroxide and 14 parts of sodium carbonate in 150 parts of water is then added rapidly to the coupling mixture. Stirring is continued for 3 hours at 0°–5° C. and at pH 8.5–9 in order to complete the coupling reaction.

The trisazo dyestuff of the structure

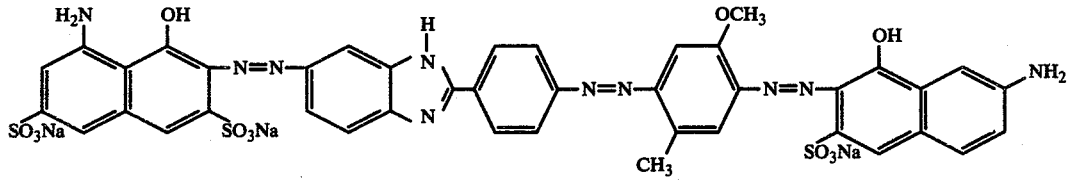

which has separated out at pH 7.5 with the aid of 150 parts of sodium chloride is filtered off and dried.

On cotton or regenerated cellulose the resulting dyestuff gives dark blue colour shades of a good depth of colour and with good fastness properties, in particular with good fastness to water and washing and very good fastness to perspiration.

Trisazo dyestuffs with a blue to blue-black shade and with similarly good fastness properties, in particular good fastness to washing, to water and perspiration, are obtained if the diazotisable coupling components 3-methylaniline, 3-methoxyaniline, 3-aminophenol, 2,5-dimethylaniline, 2-methoxy-5-chloroaniline, 2,5-dimethoxyaniline, 1-amino-3-formanilide, 1-amino-3-acetylaminobenzene, 1-amino-3-acetylamino-6-methylbenzene, 1-amino-3-oxalylaminobenzene, 1-amino-3-oxalylamino-6-methylbenzene, 1-amino-3-acetylamino-6-methoxybenzene, 1-amino-3-acetylamino-6-ethoxybenzene or 2-ethoxy-5-methylaniline are employed instead of 2-methoxy-5-methylaniline or if the coupling components 1-acetylamino-8-hydroxynaphthalene-3,6-disulphonic acid, 1-benzoylamino-8-hydroxynaphthalene-3,6-disulphonic acid, 1-amino-8-hydroxy-2,4-disulphonic acid, 1-amino-8-hydroxy-4,6-disulphonic acid or 1-amino-8-hydroxynaphthalene-4-sulphonic acid are employed instead of 1-amino-8-hydroxynaphthalene-3,6-disulphonic acid or if the coupling components 2-carboxymethylamino-8-hydroxynaphthalene-6-sulphonic acid, 2-methylamino-8-hydroxynaphthalene-6-sulphonic acid, 2-dimethylamino-8-hydroxynaphthalene-6-sulphonic acid, 2-phenylamino-8-hydroxynaphthalene-6-sulphonic acid, 2-hydroxyethylamino-8-hydroxynaphthalene-6-sulphonic acid, 2-acetylamino-8-hydroxynaphthalene-6-sulphonic acid, 2-amino-5-hydroxynaphthalene-7-sulphonic acid, 2-phenylamino-5-hydroxynaphthalene-7-sulphonic acid, 2-carboxymethylamino-5-hydroxynaphthalene-7-sulphonic acid, 2-acetylamino-5-hydroxynaphthalene-7-sulphonic acid or 2-amino-8-hydroxynaphthalene-3,6-disulphonic acid are employed instead of 2-amino-8-hydroxynaphthalene-6-sulphonic acid.

The structure of further dyestuffs which can be prepared in accordance with Examples 1 to 5 can be seen from the Table.

The following information is given in the Table:

In column 1

The coupling component $B_1$-H (XII) used

In column 2

The diazotisable coupling component $M-NH_2$ of the formula Vc

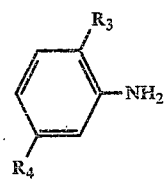

which has been used.

In column 3

Heterocyclic diamine used, heterocyclic diamines of the formula

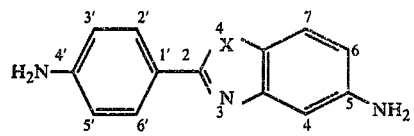

that is to say the 5-isomers, being listed in Table I and heterocyclic diamines of the formula

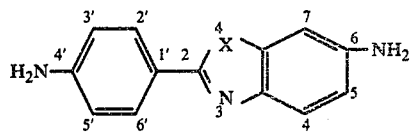

that is to say the 6-isomers, being listed in Table II. The first position in column 3 indicates the meaning of —X—. In addition, column 3 also lists substituents which may be present and their positions in the molecule, the numbering being indicated above. The entry "—NH—, 4-$CH_3$" in column 3 of Table I, for example, thus denotes the compound

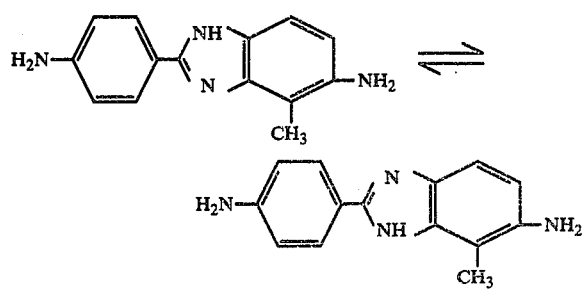

Owing to the possibility of tautomerism, this compound can be designated 4-methyl-2-(4'-aminophenyl)-5-aminobenzimidazole or 7-methyl-2-(4'-aminophenyl)-6-aminobenzimidazole.

In column 4

The coupling component $B_2H$ (X) used.

In column 5

The colour shade of the dyestuff on cotton.

Table I

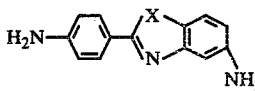

| Coupling component $B_1$—H | Diazotisable Coupling component M—$NH_2$ | X - | Coupling component $B_2$—H | Colour shade on cotton |
|---|---|---|---|---|
| 1-Hydroxynaphthalene-4-sulphonic acid | 2-Methoxy-5-methylaniline | —NH— | 1-Hydroxynaphthalene-4-sulphonic acid | blue-violet |
| 1-Hydroxynaphthalene-5-sulphonic acid | " | " | 1-Hydroxynaphthalene-5-sulphonic acid | " |
| 2-Hydroxynaphthalene-3,6-disulphonic acid | " | " | 2-Hydroxynaphthalene-3,6-disulphonic acid | " |
| 2-Hydroxynaphthalene-6,8-disulphonic acid | " | " | 2-Hydroxynaphthalene-6,8-disulphonic acid | " |
| 2-Hydroxynaphthalene-8-sulphonic acid | " | " | 2-Hydroxynaphthalene-8-sulphonic acid | " |

Table I-continued $$H_2N-\underset{}{\bigcirc}-\underset{N}{\overset{X}{C}}-\underset{}{\bigcirc}-NH_2$$

| Coupling component B₁—H | Diazotisable Coupling component M—NH₂ | X - | Coupling component B₂—H | Colour shade on cotton |
|---|---|---|---|---|
| 2-Amino-5-hydroxy-naphthalene-7-sulphonic acid | " | " | 2-Amino-5-hydroxy-naphthalene-7-sulphonic acid | brown-violet |
| 2-Carboxymethylamino-5-hydroxynaphthalene-7-sulphonic acid | " | " | 2-Carboxymethylamino-5-hydroxynaphthalene-7-sulphonic acid | " |
| 2-Carboxymethylamino-8-hydroxynaphthalene-6-sulphonic acid | " | " | 2-Carboxymethylamino-8-hydroxynaphthalene-6-sulphonic acid | blue-black |
| 2-Hydroxyethylamino-8-hydroxynaphthalene-6-sulphonic acid | 2-Methoxy-5-methyl-aniline | —NH— | 2-Hydroxyethylamino-8-hydroxynaphthalene-6-sulphonic acid | blue-black |
| 2-Sulphomethylamino-8-hydroxynaphthalene-6-sulphonic acid | " | " | 2-Sulphomethylamino-8-hydroxynaphthalene-6-sulphonic acid | " |
| Acetoacetic acid 2-sulphoanilide | 2-Methoxy-5-methyl-aniline | —NH— | Acetoacetic acid 2-sulphoanilide | orange |
| Acetoacetic acid 3-sulphoanilide | " | —NH— | Acetoacetic acid 3-sulphoanilide | " |
| Acetoacetic acid 4-sulphoanilide | " | —NH— | Acetoacetic acid 4-sulphoanilide | " |
| Acetoacetic acid 2-methoxy-4-sulphoanilide | " | —NH— | Acetoacetic acid 2-methoxy-4-sulphoanilide | " |
| Acetoacetic acid 2-methoxy-5-sulphoanilide | " | —NH— | Acetoacetic acid 2-methoxy-5-sulphoanilide | " |
| Acetoacetic acid 2-sulpho-4-chloro-5-methylanilide | " | —NH— | Acetoacetic acid 2-sulpho-4-chloro-5-methylanilide | " |
| Acetoacetic acid 2-sulpho-4,6-dimethylanilide | 2-Methoxy-5-methyl-aniline | —NH— | Acetoacetic acid 2-sulpho-4,6-dimethylanilide | orange |
| Acetoacetic acid 2,4-disulphoanilide | " | —NH— | Acetoacetic acid 2,4-disulphoanilide | " |
| Acetoacetic acid 2,5-disulphoanilide | " | —NH— | Acetoacetic acid 2,5-disulphoanilide | " |
| 2-Hydroxybenzoic acid | " | —NH— | 2-Hydroxy-3-methyl-benzoic acid | orange-brown |
| " | " | —NH— | 1-Carboxymethylamino-3-aminobenzene | " |
| " | " | —NH— | 2-Hydroxybenzene-sulphonic acid | " |
| " | " | —NH— | 1,3-Dihydroxy-benzene-4-sulphonic acid | " |
| " | " | —NH— | 1,3-Dihydroxy-benzene-5-sulphonic acid | " |
| " | " | —NH— | 1-Carboxymethylamino-3-amino-4-methyl-benzene | " |
| 2-Hydroxybenzoic acid | 2-Methoxy-5-methyl-aniline | —NH— | 3-Aminophenol-4-sulphonic acid | orange-brown |
| " | " | —NH— | 1,3-Diaminobenzene-4-sulphonic acid | " |
| " | " | —NH— | 2,4-Diaminotoluene-5-sulphonic acid | " |
| " | " | —NH— | 1,3-Diaminobenzene-4,6-disulphonic acid | " |
| " | " | —NH— | 3-Carboxymethylamino-phenol | " |
| " | " | —NH— | 1,3-Biscarboxymethyl-aminobenzene | " |
| " | " | —NH— | 2,4-Biscarboxymethyl-aminotoluene | " |
| " | " | —NH— | 1-Aminonaphthalene-4-sulphonic acid | " |
| " | " | —NH— | 1-Aminonaphthalene-6-sulphonic acid | " |
| " | " | —NH— | 1-Aminonaphthalene-7-sulphonic acid | " |
| 2-Hydroxybenzoic acid | 2-Methoxy-5-methyl-aniline | —NH— | 1-Carboxymethylamino-naphthalene-6-sulphonic acid | orange-brown |
| " | " | —NH— | 1-Carboxymethylamino-naphthalene-7-sulphonic acid | " |
| " | " | —NH— | 1-Phenylamino-naphthalene-8-sulphonic acid | " |
| " | " | —NH— | 1-Aminonaphthalene-3,6-disulphonic acid | " |
| " | " | —NH— | 2-Aminonaphthalene-3,6-disulphonic acid | " |
| " | " | —NH— | 2-Aminonaphthalene-4,8-disulphonic acid | " |
| " | " | —NH— | 1-Hydroxynaphthalene- | orange-red |

Table I-continued

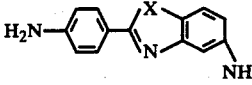

| Coupling component $B_1$—H | Diazotisable Coupling component M—$NH_2$ | X - | Coupling component $B_2$—H | Colour shade on cotton |
|---|---|---|---|---|
| " | " | —NH— | 4-sulphonic acid 1-Hydroxynaphthalene-5-sulphonic acid | " |
| " | " | —NH— | 2-Hydroxynaphthalene-6-sulphonic acid | " |
| 2-Hydroxybenzoic acid | 2-Methoxy-5-methyl-aniline | —NH— | 2-Hydroxynaphthalene-8-sulphonic acid | orange-red |
| " | " | —NH— | 2-Hydroxynaphthalene-3,6-disulphonic acid | " |
| " | " | —NH— | 2-Hydroxynaphthalene-6,8-disulphonic acid | " |
| " | " | —NH— | 1-Amin-8-hydroxy-naphthalene-3,6-disulphonic acid | green |
| " | " | —NH— | 1-Acetylamino-8-hydroxynaphthalene-3,6-disulphonic acid | " |
| 2-Hydroxy-3-methyl-benzoic acid | " | —NH— | 1-Amino-8-hydroxy-naphthalene-3,6-disulphonic acid | " |
| 2-Hydroxybenzene-sulphonic acid | " | —NH— | " | " |
| 2-Hydroxybenzoic acid | " | —NH— | Acetoacetic acid 2-sulphoanilide | yellow-orange |
| " | " | —NH— | Acetoacetic acid 3-sulphoanilide | " |
| 2-Hydroxybenzoic acid | 2-Methoxy-5-methyl-aniline | —NH— | Acetoacetic acid 4-sulphoanilide | yellow-orange |
| " | " | —NH— | Acetoacetic acid 2,4-disulphoanilide | " |
| " | " | —NH— | Acetoacetic acid 2,5-disulphoanilide | " |
| 2-Hydroxy-3-methyl-benzoic acid | " | —NH— | Acetoacetic acid 3-sulphoanilide | " |
| 2-Hydroxybenzoic acid | " | —NH— | 1-(2'-Sulphophenyl)-3-methyl-5-pyrazolone | orange |
| " | " | —NH— | 1-(3'-Sulphophenyl)-3-methyl-5-pyrazolone | " |
| " | " | —NH— | 1-(4'-Sulphophenyl)-3-methyl-5-pyrazolone | " |
| " | " | —NH— | 1-(2'-Nitro-4'-sulphophenyl)-3-methyl-5-pyrazolone | " |
| 2-Hydroxybenzoic acid | 2-Methoxy-5-methyl-aniline | —NH— | 1-(4'-Nitro-2'-sulphophenyl)-3-methyl-5-pyrazolone | orange |
| " | " | —NH— | 1-(2',5'-Dichloro-4'-sulphophenyl)-3-methyl-5-pyrazolone | " |
| " | " | —NH— | 1-(2'-Methyl-6'-chloro-4'-sulpho-phenyl)-3-methyl-5-pyrazolone | " |
| " | " | —NH— | 1-(2',4'-Disulpho-phenyl)-3-methyl-5-pyrazolone | " |
| " | " | —NH— | 1-(2',5'-Disulpho-phenyl)-3-methyl-5-pyrazolone | " |
| " | " | —NH— | 1-(4'-Sulphophenyl)-5-pyrazolone-3-carboxylic acid methyl ester | orange-red |
| " | " | —NH— | 1-(2'-Sulphophenyl)-5-pyrazolone-3-carboxylic acid | " |
| 2-Hydroxybenzoic acid | 2-Methoxy-5-methyl-aniline | —NH— | 1-(3'-Sulphophenyl)-5-pyrazolone-3-carboxylic acid | orange-red |
| " | " | —NH— | 1-(4'-Sulphophenyl)-5-pyrazolone-3-carboxylic acid | " |
| " | " | —NH— | 1-(2'-Carboxyphenyl)-5-pyrazolone-3-carboxylic acid | " |
| " | " | —NH— | 1-(2',5'-Dichloro-4'-sulphophenyl)-5-pyrazolone-3-carboxylic acid | " |
| 2-Hydroxy-3-methyl-benzoic acid | " | —NH— | 1-(4'-Sulphophenyl)-3-methyl-5-pyrazolone | " |
| " | " | —NH— | 1-(2',4'-Disulpho-phenyl)-3-methyl-5-pyrazolone | " |

Table I-continued

| Coupling component $B_1$—H | Diazotisable Coupling component M—$NH_2$ | $H_2N$—⌬—[X/N]—⌬—$NH_2$  X - | Coupling component $B_2$—H | Colour shade on cotton |
|---|---|---|---|---|
| " | " | —NH— | 1-(2',5'-Disulphophenyl)-3-methyl-5-pyrazolone | |
| 2-Hydroxy-3-methylbenzoic acid | 2-Methoxy-5-methylaniline | —NH— | 1-(4'-Sulphophenyl)-5-pyrazolone-3-carboxylic acid | orange-red |
| 1-Aminonaphthalene-4-sulphonic acid | " | —NH— | 3-Aminophenol-4-sulphonic acid | brown |
| " | " | —NH— | 1,3-Diaminobenzene-4-sulphonic acid | " |
| 1-Hydroxynaphthalene-4-sulphonic acid | " | —NH— | 1,3-Diaminobenzene-4-sulphonic acid | brown-red |
| " | " | —NH— | 1-Carboxymethylamino-3-aminobenzene | " |
| 2-Hydroxynaphthalene-3,6-disulphonic acid | " | —NH— | 1,3-Diaminobenzene | " |
| " | " | —NH— | Phenol | " |
| " | " | —NH— | 2-Hydroxybenzoic acid | " |
| " | " | —NH— | 3-Aminophenol | " |
| " | " | —NH— | 1,3-Dihydroxybenzene | " |
| 2-Hydroxynaphthalene-3,6-disulphonic acid | 2-Methoxy-5-methylaniline | —NH— | 1,3-Diamino-4-methylbenzene | brown-red |
| " | " | —NH— | 1,3-Diamino-4-methoxybenzene | " |
| " | " | —NH— | 1,3-Diamino-4-chlorobenzene | " |
| " | " | —NH— | 1,3-Diamino-4-nitrobenzene | " |
| 2-Hydroxynaphthalene-6,8-disulphonic acid | " | —NH— | 1,3-Diaminobenzene | " |
| 1-Aminonaphthalene-4-sulphonic acid | " | —NH— | 1-Hydroxynaphthalene-4-sulphonic acid | " |
| " | " | —NH— | 1-Hydroxynaphthalene-5-sulphonic acid | " |
| " | " | —NH— | 2-Hydroxynaphthalene-6-sulphonic acid | " |
| " | " | —NH— | 2-Hydroxynaphthalene-8-sulphonic acid | " |
| " | " | —NH— | 2-Hydroxynaphthalene-3,6-disulphonic acid | " |
| 1-Aminonaphthalene-4-sulphonic acid | 2-Methoxy-5-methylaniline | —NH— | 2-Hydroxynaphthalene-6,8-disulphonic acid | brown-red |
| 2-Hydroxynaphthalene-3,6-disulphonic acid | " | —NH— | 1-Phenylaminonaphthalene-8-sulphonic acid | " |
| " | " | —NH— | 1-Amino-8-hydroxy-naphthalene-4-sulphonic acid | blue |
| " | " | —NH— | 1-Amino-8-hydroxy-naphthalene-3,6-disulphonic acid | " |
| " | " | —NH— | 1-Acetylamino-8-hydroxynaphthalene-3,6-disulphonic acid | " |
| " | " | —NH— | 2-Amino-8-hydroxy-naphthalene-6-sulphonic acid | " |
| " | " | —NH— | 2-Amino-5-hydroxy-naphthalene-7-sulphonic acid | blue-violet |
| 1-Hydroxynaphthalene-4-sulphonic acid | " | —NH— | 1-Hydroxynaphthalene-5-sulphonic acid | " |
| 1-Hydroxynaphthalene-4-sulphonic acid | 2-Methoxy-5-methylaniline | —NH— | 2-Hydroxynaphthalene-6-sulphonic acid | blue-violet |
| " | " | —NH— | 2-Hydroxynaphthalene-8-sulphonic acid | " |
| " | " | —NH— | 2-Hydroxynaphthalene-3,6-disulphonic acid | " |
| " | " | —NH— | 2-Hydroxynaphthalene-6,8-disulphonic acid | " |
| " | " | —NH— | 1-Aminonaphthalene-4-sulphonic acid | brown-red |
| " | " | —NH— | 1-Aminonaphthalene-6-sulphonic acid | " |
| 2-Hydroxynaphthalene-3,6-disulphonic acid | " | —NH— | 1-Hydroxynaphthalene-4-sulphonic acid | blue-violet |
| " | " | —NH— | 1-Hydroxynaphthalene | " |
| " | " | —NH— | 2-Hydroxynaphthalene | " |
| " | " | —NH— | 2-Hydroxy-2-naphthoic acid | " |
| 2-Hydroxynaphthalene-3,6-disulphonic acid | 2-Methoxy-5-methylaniline | —NH— | 1-Hydroxynaphthalene-5-sulphonic acid | blue-violet |
| " | " | —NH— | 2-Hydroxynaphthalene-6-sulphonic acid | " |
| " | " | —NH— | 2-Hydroxynaphthalene-8-sulphonic acid | " |
| " | " | —NH— | 2-Hydroxynaphthalene- | " |

Table I-continued

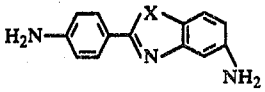

| Coupling component B₁—H | Diazotisable Coupling component M—NH₂ | X - | Coupling component B₂—H | Colour shade on cotton |
|---|---|---|---|---|
| 2-Hydroxynaphthalene-6,8-disulphonic acid | " | —NH— | 6,8-disulphonic acid 1-Hydroxynaphthalene | " |
| " | " | —NH— | 2-Hydroxynaphthalene | " |
| " | " | —NH— | 1-Hydroxynaphthalene-4-sulphonic acid | " |
| 1-Aminonaphthalene-4-sulphonic acid | " | —NH— | Acetoacetic acid 3-sulphoanilide | orange-brown |
| 1-Aminonaphthalene-6-sulphonic acid | " | —NH— | Acetoacetic acid 3-sulphoanilide | " |
| 1-Hydroxynaphthalene-4-sulphonic acid | " | —NH— | Acetoacetic acid 3-sulphoanilide | orange-red |
| 1-Hydroxynaphthalene-5-sulphonic acid | 2-Methoxy-5-methyl-aniline | —NH— | Acetoacetic acid 3-sulphoanilide | orange-red |
| 2-Hydroxynaphthalene-3,6-disulphonic acid | " | —NH— | Acetoacetic acid anilide | " |
| " | " | —NH— | Acetoacetic acid 2-methoxyanilide | " |
| " | " | —NH— | Acetoacetic acid 4-methoxyanilide | " |
| " | " | —NH— | Acetoacetic acid 4-ethoxyanilide | " |
| " | " | —NH— | Acetoacetic acid o-toluidide | " |
| " | " | —NH— | Acetoacetic acid m-toluidide | " |
| " | " | —NH— | Acetoacetic acid p-toluidide | " |
| " | " | —NH— | Acetoacetic acid 2-chloroanilide | " |
| " | " | —NH— | Acetoacetic acid 4-chloroanilide | " |
| 2-Hydroxynaphthalene-3,6-disulphonic acid | 2-Methoxy-5-methyl-aniline | —NH— | 1-Phenyl-3-methyl-5-pyrazolone | red-violet |
| " | " | —NH— | 1-(4'-Methylphenyl)-3-methyl-5-pyrazolone | " |
| 2-Hydroxynaphthalene-6,8-disulphonic acid | " | —NH— | 1-Phenyl-3-methyl-5-pyrazolone | " |
| 1-Hydroxynaphthalene | " | —NH— | 1-(4'-Sulphophenyl)-5-pyrazolone-3-carboxylic acid | " |
| 2-Hydroxynaphthalene | " | —NH— | " | " |
| 2-Hydroxynaphthalene-3-carboxylic acid | " | —NH— | " | " |
| 2-Hydroxynaphthalene | " | —NH— | 1-(2',5'-Disulpho-phenyl)-3-methyl-5-pyrazolone | " |
| 2-Hydroxynaphthalene-3-carboxylic acid | " | —NH— | 1-(4'-Sulphophenyl)-3-methyl-5-pyrazolone | " |
| 1-Hydroxynaphthalene-4-sulphonic acid | " | —NH— | 4-Methyl-6-hydroxy-2-pyridone-3-sulphonic acid | " |
| 2-Hydroxynaphthalene-3,6-disulphonic acid | 2-Methoxy-5-methyl-aniline | —NH— | 4-Methyl-6-hydroxy-2-pyridone-3-sulphonic acid | red-violet |
| " | " | —NH— | 1,4-Dimethyl-6-hydroxy-2-pyridone-3-sulphonic acid | " |
| " | " | —NH— | 4-Methyl-3-cyano-6-hydroxy-2-pyridone | " |
| " | " | —NH— | 1,4-Dimethyl-3-cyano-6-hydroxy-2-pyridone | " |
| Acetoacetic acid 3-sulphoanilide | " | —NH— | 1-Hydroxynaphthalene-4-sulphonic acid | red-orange |
| " | " | —NH— | 2-Hydroxynaphthalene-3,6-disulphonic acid | " |
| " | " | —NH— | 1,3-Diaminobenzene-4-sulphonic acid | brown-orange |
| " | " | —NH— | 2,4-Diaminotoluene-5-sulphonic acid | " |
| " | " | —NH— | 3-Carboxymethylamino-phenol | " |
| Acetoacetic acid 3-sulphoanilide | 2-Methoxy-5-methyl-aniline | —NH— | 1-Carboxymethyl-amino-3-amino-benzene | brown-orange |
| " | " | —NH— | 1,3-Biscarboxy-methylaminobenzene | " |
| " | " | —NH— | 1-Carboxymethyl-amino-3-amino-4-methylbenzene | " |
| Acetoacetic acid anilide | " | —NH— | 1,3-Diaminobenzene-4,6-disulphonic acid | " |
| Acetoacetic acid 2,5-disulphoanilide | " | —NH— | 1,3-Dihydroxybenzene | " |
| " | " | —NH— | 3-Aminophenol | " |
| " | " | —NH— | 1,3-Diaminobenzene | " |
| " | " | —NH— | 2,4-Diaminotoluene | " |

Table I-continued

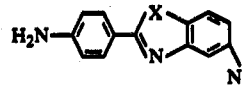

| Coupling component B₁—H | Diazotisable Coupling component M—NH₂ | X - | Coupling component B₂—H | Colour shade on cotton |
|---|---|---|---|---|
| Acetoacetic acid 3-sulphoanilide | " | —NH— | 1-Aminonaphthalene-4-sulphonic acid | orange-brown |
| " | " | —NH— | 1-Aminonaphthalene-5-sulphonic acid | " |
| " | " | —NH— | 1-Aminonaphthalene-6-sulphonic acid | " |
| Acetoacetic acid 3-sulphoanilide | 2-Methoxy-5-methyl-aniline | —NH— | 1-Aminonaphthalene-7-sulphonic acid | orange-brown |
| " | " | —NH— | 1-Carboxymethyl-aminonaphthalene-6-sulphonic acid | " |
| " | " | —NH— | 1-Carboxymethyl-aminonaphthalene-7-sulphonic acid | " |
| " | " | —NH— | 2-Aminonaphthalene-6-sulphonic acid | " |
| " | " | —NH— | 1-Phenylamino-naphthalene-8-sulphonic acid | " |
| " | " | —NH— | 2-Amino-8-hydroxy-naphthalene-6-sulphonic acid | brown |
| Acetoacetic acid 2-sulphoanilide | " | —NH— | " | " |
| Acetoacetic acid 4-sulphoanilide | " | —NH— | " | " |
| Acetoacetic acid 4-carboxyanilide | " | —NH— | " | " |
| Acetoacetic acid 2,5-disulphoanilide | 2-Methoxy-5-methylaniline | —NH— | 2-Amino-8-hydroxy-naphthalene-6-sulphonic acid | brown |
| Acetoacetic acid 3-sulphoanilide | " | —NH— | 2-Methylamino-8-hydroxynaphthalene-6-sulphonic acid | " |
| " | " | —NH— | 2-Dimethylamino-8-hydroxynaphthalene-6-sulphonic acid | " |
| " | " | —NH— | 2-Phenylamino-8-hydroxynaphthalene-6-sulphonic acid | " |
| " | " | —NH— | 2-Acetylamino-8-hydroxynaphthalene-6-sulphonic acid | brown-red |
| " | " | —NH— | 2-Acetylamino-5-hydroxynaphthalene-7-sulphonic acid | " |
| " | " | —NH— | 1-Amino-8-hydroxy-naphthalene-3,6-disulphonic acid | green |
| Acetoacetic acid 4-carboxyanilide | " | —NH— | 1-Amino-8-hydroxy-naphthalene-3,6-disulphonic acid | " |
| Acetoacetic acid 3-sulphoanilide | 2-Methoxy-5-methyl-aniline | —NH— | 2-Carboxymethyl-amino-8-hydroxy-naphthalene-6-sulphonic acid | brown |
| " | " | —NH— | 2-Amino-5-hydroxy-naphthalene-7-sulphonic acid | red-brown |
| " | " | —NH— | Acetoacetic acid 2-sulphoanilide | orange |
| " | " | —NH— | Acetoacetic acid 4-sulphoanilide | " |
| Acetoacetic acid 4-carboxyanilide | " | —NH— | Acetoacetic acid 3-sulphoanilide | " |
| " | " | —NH— | Acetoacetic acid 2,5-disulphoanilide | " |
| Acetoacetic acid 2,5-disulphoanilide | " | —NH— | Acetoacetic acid anilide | " |
| " | " | —NH— | Acetoacetic acid 2-methoxyanilide | " |
| " | " | —NH— | Acetoacetic acid 4-methoxyanilide | " |
| Acetoacetic acid 3-sulphoanilide | 2-Methoxy-5-methyl-aniline | —NH— | 1-(2'-Sulphophenyl)-3-methyl-5-pyrazolone | orange |
| " | " | —NH— | 1-(3'-Sulphophenyl)-3-methyl-5-pyrazolone | " |
| " | " | —NH— | 1-(4'-Sulphophenyl)-3-methyl-5-pyrazolone | " |
| " | " | —NH— | 1-(2'-chloro-4'-sulphophenyl)-3-methyl-5-pyrazolone | " |
| " | " | —NH— | 1-(6'-chloro-3'-sulphophenyl)-3-methyl-5-pyrazolone | " |
| " | " | —NH— | 1-(2',5'-dichloro-4'-sulphophenyl)-3-methyl-5-pyrazolone | " |

Table I-continued $$H_2N-\underset{}{\text{[phenyl]}}-\underset{N}{\overset{X}{\text{[benzimidazole]}}}-NH_2$$

| Coupling component B₁—H | Diazotisable Coupling component M—NH₂ | X - | Coupling component B₂—H | Colour shade on cotton |
|---|---|---|---|---|
| " | " | —NH— | 1-(2',4'-Disulpho-phenyl)-3-methyl-5-pyrazolone | " |
| " | " | —NH— | 1-(2',5'-Disulpho-phenyl)-3-methyl-5-pyrazolone | " |
| Acetoacetic acid 3-sulphoanilide | 2-Methoxy-5-methyl-aniline | —NH— | 1-Phenyl-5-pyrazo-lone-3-carboxylic acid | orange |
| " | " | —NH— | 1-(4'-Sulphophenyl)-5-pyrazolone-3-carboxylic acid | " |
| " | " | —NH— | 1-(4'-Sulphophenyl)-5-pyrazolone-3-carboxylic acid ester | " |
| " | " | —NH— | 1-(2',5'-dichloro-4'-sulphophenyl)-5-pyrazolone-3-carboxylic acid | " |
| " | " | —NH— | 4-Methyl-6-hydroxy-2-pyridone-3-sulphonic acid | orange-red |
| " | " | —NH— | 1,4-Dimethyl-6-hydroxy-2-pyridone-3-sulphonic acid | " |
| 1-(2',4'-Disulpho-phenyl)-3-methyl-5-pyrazolone | " | —NH— | 1,3-Diaminobenzene | brown |
| 1-(2',5'-Disulpho-phenyl)-3-methyl-5-pyrazolone | 2-Methoxy-5-methyl-aniline | —NH— | Phenol | orange |
| " | " | —NH— | 1,3-dihydroxybenzene | orange-brown |
| " | " | —NH— | 3-Aminophenol | brown |
| " | " | —NH— | 1,3-Diaminobenzene | " |
| " | " | —NH— | 2,4-Diaminotoluene | " |
| 1-(4'-Sulphophenyl)-5-pyrazolone-3-carboxylic acid | " | —NH— | 1-Amino-8-hydroxy-naphthalene-3,6-disulphonic acid | black-green |
| 1-Phenyl-5-pyrazolone-3-carboxylic acid | " | —NH— | " | " |
| 1-(4'-Sulphophenyl)-3-methyl-5-pyrazolone | " | —NH— | | |
| " | " | —NH— | 1-Aminonaphthalene-4-sulphonic acid | red-brown |
| " | " | —NH— | 1-Aminonaphthalene-5-sulphonic acid | " |
| " | " | —NH— | 1-Aminonaphthalene-6-sulphonic acid | " |
| 1-(4'-Sulphophenyl)-3-methyl-5-pyrazolone | 2-Methoxy-5-methyl-aniline | —NH— | 1-Aminonaphthalene-7-sulphonic acid | red-brown |
| " | " | —NH— | 1-Phenylamino-naphthalene-8-sulphonic acid | " |
| " | " | —NH— | 1-Carboxymethyl-aminonaphthalene-6-sulphonic acid | " |
| " | " | —NH— | 1-Carboxymethyl-amino-7-sulphonic acid | " |
| " | " | —NH— | 2-Aminonaphthalene-6-sulphonic acid | " |
| " | " | —NH— | 2-Aminonaphthalene-3,6-disulphonic acid | brown |
| " | " | —NH— | 2-Aminonaphthalene-6,8-disulphonic acid | " |
| " | " | —NH— | 1-Hydroxynaphthalene-4-sulphonic acid | red-violet |
| " | " | —NH— | 1-Hydroxynaphthalene-5-sulphonic acid | " |
| 1-(4'-Sulphophenyl)-3-methyl-5-pyrazolone | 2-Methoxy-5-methyl-aniline | —NH— | 2-Hydroxynaphthalene-6-sulphonic acid | red-violet |
| " | " | —NH— | 2-Hydroxynaphthalene-8-sulphonic acid | " |
| " | " | —NH— | 2-Hydroxynaphthalene-3,6-disulphonic acid | " |
| " | " | —NH— | 2-Hydroxynaphthalene-6,8-disulphonic acid | " |
| 1-Hydroxynaphthalene-4-sulphonic acid | " | —NH— | 1-Amino-8-hydroxy-naphthalene-3,6-disulphonic acid | blue |
| 1-Hydroxynaphthalene-5-sulphonic acid | " | —NH— | " | " |
| 1-Hydroxynaphthalene-4-sulphonic acid | " | —NH— | 1-Acetylamino-8-hydroxynaphthalene-3,6-disulphonic acid | " |
| 2-Amino-8-hydroxy- | " | —NH— | 2-Hydroxynaphthalene- | " |

Table I-continued $H_2N-\underset{}{\bigcirc}-\underset{N}{\overset{X}{\bigcirc}}-NH_2$

| Coupling component B₁—H | Diazotisable Coupling component M—NH₂ | X— | Coupling component B₂—H | Colour shade on cotton |
|---|---|---|---|---|
| naphthalene-6-sulphonic acid | | | 3,6-disulphonic acid | |
| 2-Amino-8-hydroxy-naphthalene-6-sulphonic acid | " | —NH— | 2-Carboxymethylamino-8-hydroxynaphthalene-6-sulphonic acid | blue-black |
| 2-Amino-8-hydroxy-naphthalene-6-sulphonic acid | 2-Methoxy-5-methylaniline | —NH— | 2-Amino-8-hydroxy-naphthalene-3,6-disulphonic acid | blue-black |
| 2-Hydroxynaphthalene-6,8-disulphonic acid | " | —NH— | 1-Amino-8-hydroxy-naphthalene-4-sulphonic acid | blue |
| " | " | —NH— | 1-Amino-8-hydroxy-naphthalene-3,6-disulphonic acid | " |
| 1-Phenyl-5-pyrazolone-3-carboxylic acid | " | —NH— | 1-Aminonaphthalene-4-sulphonic acid | red-brown |
| " | " | —NH— | 1-Aminonaphthalene-6-sulphonic acid | " |
| " | " | —NH— | 1-Hydroxynaphthalene-4-sulphonic acid | red-violet |
| " | " | —NH— | 2-Hydroxynaphthalene-3,6-disulphonic acid | " |
| 1-(4'-Sulphophenyl)-5-pyrazolone-3-carboxylic acid | " | —NH— | 1-Phenylamino-naphthalene-8-sulphonic acid | brown |
| " | " | —NH— | 1-Hydroxynaphthalene | red-violet |
| " | " | —NH— | 2-Hydroxynaphthalene | " |
| 1-(4'-Sulphophenyl)-5-pyrazolone-3-carboxylic acid | 2-Methoxy-5-methyl-aniline | —NH— | 2-Hydroxynaphthalene-3-carboxylic acid | red-violet |
| " | " | —NH— | 1-Hydroxynaphthalene-4-sulphonic acid | " |
| 1-Hydroxynaphthalene | " | —NH— | Acetoacetic acid 2,5-disulphoanilide | orange-red |
| 2-Hydroxynaphthalene | " | —NH— | Acetoacetic acid 2,5-disulphoanilide | " |
| 2-Hydroxynaphthalene-3-carboxylic acid | " | —NH— | Acetoacetic acid 2,5-disulphoanilide | " |
| 1-(4'-Sulphophenyl)-3-methyl-5-pyrazolone | " | —NH— | 2-Amino-8-hydroxy-naphthalene-6-sulphonic acid | brown |
| 1-(2'-Sulphophenyl)-3-methyl-5-pyrazolone | " | —NH— | " | " |
| 1-(3'-Sulphophenyl)-3-methyl-5-pyrazolone | " | —NH— | " | " |
| 1-Phenyl-5-pyrazolone-3-carboxylic acid | " | —NH— | " | " |
| 1-(4'-Sulphophenyl)-5-pyrazolone-3-carboxylic acid | 2-Methoxy-5-methyl-aniline | —NH— | 2-Amino-8-hydroxy-naphthalene-6-sulphonic acid | brown |
| " | " | —NH— | 2-Amino-5-hydroxy-naphthalene-7-sulphonic acid | red-brown |
| 1-(4'-Sulphophenyl)-3-methyl-5-pyrazolone | " | —NH— | 2-Methylamino-8-hydroxynaphthalene-6-sulphonic acid | brown |
| " | " | —NH— | 2-Dimethylamino-8-hydroxynaphthalene-6-sulphonic acid | " |
| " | " | —NH— | 2-Phenylamino-8-hydroxynaphthalene-6-sulphonic acid | " |
| " | " | —NH— | 2-Carboxymethylamino-8-hydroxynaphthalene-6-sulphonic acid | " |
| " | " | —NH— | Acetoacetic acid 3-sulphoanilide | orange |
| 1-Phenyl-5-pyrazolone-3-carboxylic acid | 2-Methoxy-5-methyl-aniline | —NH— | Acetoacetic acid 3-sulphoanilide | orange |
| 1-(4'-Sulphophenyl)-5-pyrazolone-3-carboxylic acid | " | —NH— | " | " |
| " | " | —NH— | Aceotacetic acid anilide | " |
| 1-(2',5'-Dichloro-4'-sulphophenyl)-3-methyl-5-pyrazolone | " | —NH— | Acetoacetic acid 3-sulphoanilide | " |
| 1-(2',4'-Disulpho-phenyl)-3-methyl-5-pyrazolone | " | —NH— | Acetoacetic acid anilide | " |
| 1-(2',5'-Disulpho-phenyl)-3-methyl-5-pyrazolone | " | —NH— | " | " |
| " | " | —NH— | Acetoacetic acid 2-methoxyanilide | " |
| 1-Phenyl-5-pyrazo- | " | —NH— | Acetoacetic acid | " |

Table I-continued

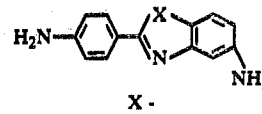

| Coupling component B₁—H | Diazotisable Coupling component M—NH₂ | X - | Coupling component B₂—H | Colour shade on cotton |
|---|---|---|---|---|
| lone-3-carboxylic acid | | | 2,5-disulphoanilide | |
| 1-Phenyl-5-pyrazolone-3-carboxylic acid | 2-Methoxy-5-methyl-aniline | —NH— | 1,3-Dihydroxybenzene-4-sulphonic acid | red-brown |
| " | " | —NH— | 3-Aminophenol-4-sulphonic acid | " |
| " | " | —NH— | 1,3-Diaminobenzene-4-sulphonic acid | brown |
| " | " | —NH— | 2,4-Diaminotoluene-5-sulphonic acid | " |
| 1-(4'-Sulphophenyl)-3-methyl-5-pyrazolone | " | —NH— | 2-Hydroxybenzoic acid | orange |
| " | " | —NH— | 3-Hydroxybenzene-sulphonic acid | " |
| " | " | —NH— | 1,3-Dihydroxybenzene-4-sulphonic acid | orange-brown |
| " | " | —NH— | 3-Aminophenol-4-sulphonic acid | " |
| " | " | —NH— | 1,3-Diaminobenzene-4-sulphonic acid | red-brown |
| " | " | —NH— | 2,4-Diaminotoluene-5-sulphonic acid | " |
| 1-(4'-Sulphophenyl)-3-methyl-5-pyrazolone | 2-Methoxy-5-methyl-aniline | —NH— | 3-Carboxymethylamino-phenol | red-brown |
| " | " | —NH— | 1-Carboxymethylamino-3-aminobenzene | " |
| " | " | —NH— | 1,3-Biscarboxymethyl-aminobenzene | " |
| " | " | —NH— | 1-Carboxymethylamino-3-amino-4-methyl-benzene | " |
| 1-(4'-Sulphophenyl)-pyrazolone-3-carboxylic acid | " | —NH— | Phenol | orange-red |
| " | " | —NH— | 3-Aminophenol | red-brown |
| " | " | —NH— | 1,3-Dihydroxybenzene | " |
| " | " | —NH— | 1,3-Diaminobenzene | brown |
| " | " | —NH— | 1,3-Diamino-4-methyl-benzene | " |
| " | " | —NH— | 1,4-Diamino-4-methoxybenzene | " |
| " | " | —NH— | 1,3-Diamino-4-chloro-benzene | " |
| 1-(4'-Sulphophenyl)-3-methyl-5-pyrazolone | 2-Methoxy-5-methyl-aniline | —NH— | 1-(2'-Sulphophenyl)-3-methyl-5-pyrazolone | orange |
| " | " | —NH— | 1-(3'-Sulphophenyl)-3-methyl-5-pyrazolone | " |
| " | " | —NH— | 1-Phenyl-5-pyrazolone-3-carboxylic acid | " |
| " | " | —NH— | 1-(4'-Sulphophenyl)-5-pyrazolone-3-carboxylic acid | " |
| " | " | —NH— | 1-(4'-Sulphophenyl)-5-pyrazolone-3-carboxylic acid ethyl ester | " |
| " | " | —NH— | 1-(4'-Sulphophenyl)-5-pyrazolone-3-carboxylic acid amide | " |
| 1-(2',5'-Disulpho-phenyl)-3-methyl-5-pyrazolone | " | —NH— | 1-Phenyl-3-methyl-5-pyrazolone | " |
| " | " | —NH— | 3-Methyl-5-pyrazolone | " |
| 1-(4'-Sulphophenyl)-3-methyl-5-pyrazolone | " | —NH— | 4-Methyl-6-hydroxy-2-pyridone-3-sulphonic acid | orange-red |
| 1-(4'-Sulphophenyl)-3-methyl-5-pyrazolone | 2-Methoxy-5-methyl-aniline | —NH— | 1,4-Dimethyl-6-hydroxy-2-pyridone-3-sulphonic acid | orange-red |
| 1-(4'-Sulphophenyl)-5-pyrazolone-3-carboxylic acid | " | —NH— | 4-Methyl-6-hydroxy-2-pyridone-3-sulphonic acid | " |
| 1-(2',5'-Disulpho-phenyl)-3-methyl-5-pyrazolone | " | —NH— | " | " |
| " | " | —NH— | 4-Methyl-3-cyano-6-hydroxy-2-pyridone | " |
| " | " | —NH— | 1,4-Dimethyl-3-cyano-6-hydroxy-2-pyridone | " |
| 1-Phenyl-5-pyrazolone-3-carboxylic acid | " | —NH— | 1-(4'-Sulphophenyl)-3-methyl-5-pyrazolone | " |
| 1-(4'-Sulphophenyl)-5-pyrazolone-3-carboxylic acid | " | —NH— | 1-(4'-Sulphophenyl)-3-methyl-5-pyrazolone | " |
| 4-Methyl-6-hydroxy-2-pyridone-3-sulphonic acid | " | —NH— | Acetoacetic acid 3-sulphoanilide | " |
| " | " | —NH— | Acetoacetic acid | " |

Table I-continued

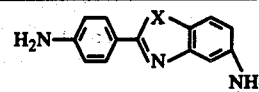

| Coupling component B₁—H | Diazotisable Coupling component M—NH₂ | X - | Coupling component B₂—H | Colour shade on cotton |
|---|---|---|---|---|
| 4-Methyl-3-sulpho-6-hydroxy-2-pyridone | 2-Methoxy-5-methyl-aniline | —NH— | 2,5-disulphoanilide 1,3-Dihydroxybenzene-4-sulphonic acid | red-brown |
| " | " | —NH— | 3-Aminophenol-4-sulphonic acid | " |
| " | " | —NH— | 1,3-Diaminobenzene-4-sulphonic acid | " |
| " | " | —NH— | 2,4-Diaminotoluene-5-sulphonic acid | " |
| " | " | —NH— | 1,3-Biscarboxymethyl-aminobenzene | " |
| " | " | —NH— | 1,3-Bissulphomethyl-aminobenzene | " |
| " | " | —NH— | 1,3-Biscarboxymethyl-amino-4-methylbenzene | " |
| " | " | —NH— | 1,3-Diaminobenzene-4,6-disulphonic acid | " |
| " | " | —NH— | 1-Aminonaphthalene-4-sulphonic acid | brown |
| " | " | —NH— | 1-Aminonaphthalene-6-sulphonic acid | " |
| 4-Methyl-3-sulpho-6-hydroxy-2-pyridone | 2-Methoxy-5-methyl-aniline | —NH— | 1-Aminonaphthalene-7-sulphonic acid | brown |
| " | " | —NH— | 1-Carboxymethylamino-naphthalene-6-sulphonic acid | " |
| " | " | —NH— | 1-Carboxymethylamino-naphthalene-7-sulphonic acid | " |
| " | " | —NH— | 2-Aminonaphthalene-3,6-disulphonic acid | " |
| " | " | —NH— | 2-Aminonaphthalene-6,8-disulphonic acid | " |
| " | " | —NH— | 1-Hydroxynaphthalene-4-sulphonic acid | red-violet |
| " | " | —NH— | 1-Hydroxynaphthalene-5-sulphonic acid | " |
| 4-Methyl-6-hydroxy-2-pyridone-3-sulphonic acid | " | —NH— | 2-Hydroxynaphthalene-3,6-disulphonic acid | " |
| " | " | —NH— | 2-Hydroxynaphthalene-6,8-disulphonic acid | " |
| 4-Methyl-6-hydroxy-2-pyridone-3-sulphonic acid | 2-Methoxy-5-methyl-aniline | —NH— | 2-Amino-8-hydroxy-naphthalene-6-sulphonic acid | brown |
| " | " | —NH— | 2-Amino-8-hydroxy-naphthalene-3,6-disulphonic acid | " |
| " | " | —NH— | 2-Carboxymethylamino-8-hydroxynaphthalene-6-sulphonic acid | " |
| " | " | —NH— | 1-Amino-8-hydroxy-naphthalene-3,6-disulphonic acid | black-green |
| " | " | —NH— | 1-(2'-Sulphophenyl)-3-methyl-5-pyrazolone | orange-red |
| " | " | —NH— | 1-(3'-Sulphophenyl)-3-methyl-5-pyrazolone | " |
| " | " | —NH— | 1-(4'-Sulphophenyl)-3-methyl-5-pyrazolone | " |
| 4-Methyl-6-hydroxy-2-pyridone-3-sulphonic acid | 2-Methoxy-5-methyl-aniline | —NH— | 1-(4'-Sulphophenyl)-5-pyrazolone-3-carboxylic acid | orange-red |
| " | " | —NH— | 1-(2',4'-Disulpho-phenyl)-3-methyl-5-pyrazolone | " |
| " | " | —NH— | 1-(2',5'-Disulpho-phenyl)-3-methyl-5-pyrazolone | " |
| 1,4-Dimethyl-6-hydroxy-2-pyridone-3-sulphonic acid | " | —NH— | 1,3-Diaminobenzene-4-sulphonic acid | brown |
| " | " | —NH— | 2,4-Diaminotoluene-5-sulphonic acid | " |
| " | " | —NH— | 3-Aminophenol-4-sulphonic acid | " |
| " | " | —NH— | 1-Aminonaphthalene-6-sulphonic acid | " |
| " | " | —NH— | 1-Hydroxynaphthalene-4-sulphonic acid | red-violet |
| " | " | —NH— | 2-Hydroxynaphthalene-3,6-disulphonic acid | " |
| 1,4-Dimethyl-6-hydroxy-2-pyridone-3-sulphonic acid | 2-Methoxy-5-methyl-aniline | —NH— | 2-Amino-8-hydroxy-naphthalene-6-sulphonic acid | brown |
| " | " | —NH— | Acetoacetic acid 3-sulphoanilide | orange |
| " | " | —NH— | 1-(4'-Sulphophenyl)- | orange- |

Table I-continued

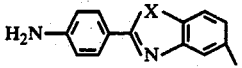

| Coupling component B₁—H | Diazotisable Coupling component M—NH₂ | X - | Coupling component B₂—H | Colour shade on cotton |
|---|---|---|---|---|
| 1-Hydroxynaphthalene-4-sulphonic acid | 2,5-Dimethylaniline | —NH— | 3-methyl-5-pyrazolone 1-Hydroxynaphthalene-4-sulphonic acid | red red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | 2-Amino-8-hydroxy-naphthalene-6-sulphonic acid | brown |
| 1-(4'-Sulphophenyl)-3-methyl-5-pyrazolone | " | —NH— | " | " |
| Acetoacetic acid 3-sulphoanilide | " | —NH— | Acetoacetic acid 3-sulphoanilide | yellow-orange |
| 1-Hydroxynaphthalene-4-sulphonic acid | 2,5-Dimethoxy-aniline | —NH— | 1-Hydroxynaphthalene-4-sulphonic acid | red-violet |
| 2-Hydroxynaphthalene-3,6-disulphonic acid | 2,5-Dimethoxy-aniline | —NH— | 2-Hydroxynaphthalene-3,6-disulphonic acid | red-violet |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-Sulphophenyl)-3-methyl-5-pyrazolone | " | —NH— | 2-Amino-8-hydroxy-naphthalene-6-sulphonic acid | brown |
| Acetoacetic acid 3-sulphoanilide | " | —NH— | 2-Amino-8-hydroxy-naphthalene-6-sulphonic acid | " |
| 1-Hydroxynaphthalene-4-sulphonic acid | 3-Methylaniline | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | 2-Amino-8-hydroxy-naphthalene-6-sulphonic acid | brown |
| 1-(4'-Sulphophenyl)-3-methyl-5-pyrazolone | " | —NH— | " | " |
| Acetoacetic acid 3-sulphoanilide | 3-Methylaniline | —NH— | Acetoacetic acid 3-sulphoanilide | yellow-orange |
| 1-Hydroxynaphthalene-4-sulphonic acid | 3-Methoxyaniline | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-Sulphophenyl)-3-methyl-5-pyrazolone | " | —NH— | 2-Amino-8-hydroxy-naphthalene-6-sulphonic acid | brown |
| Acetoacetic acid 3-sulphoanilide | " | —NH— | 2-Amino-8-hydroxy-naphthalene-6-sulphonic acid | brown |
| 1-Hydroxynaphthalene-4-sulphonic acid | 2-Ethoxy-5-methyl-aniline | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | 2-Ethoxy-5-methyl-aniline | —NH— | 2-Amino-8-hydroxy-naphthalene-6-sulphonic acid | brown |
| 1-(4'-Sulphophenyl)-3-methyl-5-pyrazolone | " | —NH— | " | brown |
| Acetoacetic acid 3-sulphoanilide | " | —NH— | Acetoacetic acid 3-sulphoanilide | yellow-orange |
| 1-Hydroxynaphthalene-4-sulphonic acid | 3-Aminophenol | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-sulphophenyl)-3-methyl-5-pyrazolone | " | —NH— | 2-Amino-8-hydroxy-naphthalene-6-sulphonic acid | brown |
| Acetoacetic acid 3-sulphoanilide | " | —NH— | 2-Amino-8-hydroxy-naphthalene-6-sulphonic acid | " |
| 1-Hydroxynaphthalene-4-sulphonic acid | 1-Amino-3-acetyl-aminobenzene | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | | —NH— | 2-Hydroxynaphthalene-6,8-disulphonic acid | |

Table I-continued

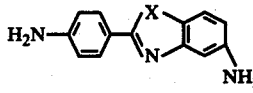

| Coupling component $B_1$—H | Diazotisable Coupling component M—$NH_2$ | X- | Coupling component $B_2$—H | Colour shade on cotton |
|---|---|---|---|---|
| Acetoacetic acid 3-sulphoanilide | " | —NH— | 2-Amino-8-hydroxy-naphthalene-6-sulphonic acid | brown |
| 1-(4'-Sulphophenyl)-3-methyl-5-pyrazolone | " | —NH— | " | " |
| Acetoacetic acid 3-sulphoanilide | " | —NH— | Acetoacetic acid 3-sulphoanilide | yellow-orange |
| 1-Hydroxynaphthalene-4-sulphonic acid | 1-Amino-3-acetyl-amino-6-methyl-benzene | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-Sulphophenyl)-3-methyl-5-pyrazolone | 1-Amino-3-acetyl-amino-6-methyl-benzene | —NH— | 2-Amino-8-hydroxy-naphthalene-6-sulphonic acid | brown |
| Acetoacetic acid 3-sulphoanilide | " | —NH— | " | " |
| 1-Hydroxynaphthalene-4-sulphonic acid | 1-Amino-3-oxalyl-aminobenzene | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | 2-Amino-8-hydroxy-naphthalene-6-sulphonic acid | brown |
| 1-(4'-Sulphophenyl)-3-methyl-5-pyrazolone | " | —NH— | " | " |
| Acetoacetic acid 3-sulphoanilide | " | —NH— | Acetoacetic acid 3-sulphoanilide | yellow-orange |
| 1-Hydroxynaphthalene-4-sulphonic acid | 1-Amino-3-oxalyl-amino-6-methyl-benzene | —NH— | 1-Hydroxynaphthalene-4-sulphonic acid | red-violet |
| 2-Hydroxynaphthalene-3,6-disulphonic acid | 1-Amino-3-oxalyl-amino-6-methyl-benzene | —NH— | 2-Hydroxynaphthalene-3,6-disulphonic acid | red-violet |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-Sulphophenyl)-3-methyl-5-pyrazolone | " | —NH— | 2-Amino-8-hydroxy-naphthalene-6-sulphonic acid | brown |
| Acetoacetic acid 3-sulphoanilide | " | —NH— | 2-Amino-8-hydroxy-naphthalene-6-sulphonic acid | brown |
| 1-Hydroxynaphthalene-4-sulphonic acid | 1-Amino-3-acetyl-amino-6-methoxy-benzene | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | 2-Amino-8-hydroxy-naphthalene-6-sulphonic acid | brown |
| 1-(4'-Sulphophenyl)-3-methyl-5-pyrazolone | 1-Amino-3-acetyl-amino-6-methoxy-benzene | —NH— | 2-Amino-8-hydroxy-naphthalene-6-sulphonic acid | brown |
| Acetoacetic acid 3-sulphoanilide | " | —NH— | Acetoacetic acid 3-sulphoanilide | yellow-orange |
| 1-Hydroxynaphthalene-4-sulphonic acid | 1-Amino-3-acetyl-amino-6-ethoxy-benzene | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | Acetoacetic acid 3-sulphoanilide | yellow-orange |
| 1-(4'-Sulphophenyl)-3-methyl-5-pyrazolone | " | —NH— | 2-Amino-8-hydroxy-naphthalene-6-sulphonic acid | brown |
| Acetoacetic acid 3-sulphoanilide | " | —NH— | " | " |
| 1-Hydroxynaphthalene-4-sulphonic acid | 2-Methoxy-5-chloro-aniline | —NH— | 1-Hydroxynaphthalene-4-sulphonic acid | red-violet |
| 2-Hydroxynaphthalene-3,6-disulphonic acid | " | —NH— | 2-Hydroxynaphthalene-3,6-disulphonic acid | " |
| 2-Hydroxynaphthalene-6,8-disulphonic acid | " | —NH— | 2-Hydroxynaphthalene-6,8-disulphonic acid | " |
| Acetoacetic acid 3-sulphoanilide | " | —NH— | 2-Amino-8-hydroxy-naphthalene-6-sulphonic acid | brown |

Table I-continued

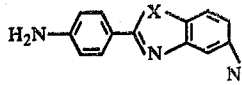

| Coupling component B₁—H | Diazotisable Coupling component M—NH₂ | X— | Coupling component B₂—H | Colour shade on cotton |
|---|---|---|---|---|
| 1-(4'-Sulphophenyl)-3-methyl-5-pyrazolone | " | —NH— | " | " |
| Acetoacetic acid 3-sulphoanilide | " | —NH— | Acetoacetic acid 3-sulphoanilide | yellow-orange |
| 2-Amino-8-hydroxynaphthalene-6-sulphonic acid | 1-Amino-3-oxalylaminobenzene | —NH— | 2-Amino-8-hydroxynaphthalene-6-sulphonic acid | black-blue |
| " | 1-Amino-3-oxalylamino-6-methylbenzene | —NH— | " | " |
| 2-Hydroxynaphthalene-3,6-disulphonic acid | 1-Amino-3-oxalylaminobenzene | —NH— | 1,3-Diaminobenzene | violet |
| 1,3-Dihydroxybenzene | " | —NH— | 1,3-Dihydroxybenzene | red |
| 1-Hydroxynaphthalene-4-sulphonic acid | 1-Amino-3-oxalylaminobenzene | —NH— | 2-Hydroxynaphthalene | violet |
| 1-(4'-Sulphophenyl)-3-methyl-5-pyrazolone | Aniline | —NH— | 1-(4'-Sulphophenyl)-3-methyl-5-pyrazolone | orange |
| 2-Hydroxybenzoic acid | " | —NH— | 2-Amino-8-hydroxynaphthalene-6-sulphonic acid | brown |
| " | " | —NH— | 2-Carboxymethylamino-8-hydroxynaphthalene-6-sulphonic acid | " |
| 1-Amino-8-hydroxynaphthalene-3,6-disulphonic acid | " | —NH— | 1-Amino-8-hydroxynaphthalene-3,6-disulphonic acid | blue |
| " | " | —NH— | 2-Amino-8-hydroxynaphthalene-6-sulphonic acid | " |
| 1-(4'-Sulphophenyl)-3-methyl-5-pyrazolone | 2-Aminotoluene | —NH— | 1-(4'-Sulphophenyl)-3-methyl-5-pyrazolone | orange |
| 2-Hydroxybenzoic acid | " | —NH— | 2-Amino-8-hydroxynaphthalene-6-sulphonic acid | brown |
| 2-Hydroxybenzoic acid | 2-Aminotoluene | —NH— | 2-Carboxymethylamino-8-hydroxynaphthalene-6-sulphonic acid | brown |
| 1-Amino-8-hydroxynaphthalene-3,6-disulphonic acid | " | —NH— | 1-Amino-8-hydroxynaphthalene-3,6-disulphonic acid | blue |
| " | " | —NH— | 2-Amino-8-hydroxynaphthalene-6-sulphonic acid | blue |
| 1-(4'-Sulphophenyl)-3-methyl-5-pyrazolone | 2-Methoxyaniline | —NH— | 1-(4'-Sulphophenyl)-3-methyl-5-pyrazolone | orange |
| 2-Hydrobenzoic acid | " | —NH— | 2-Amino-8-hydroxynaphthalene-6-sulphonic acid | brown |
| " | " | —NH— | 2-Carboxymethylamino-8-hydroxynaphthalene-6-sulphonic acid | brown |
| 1-Amino-8-hydroxynaphthalene-3,6-disulphonic acid | " | —NH— | 1-Amino-8-hydroxynaphthalene-3,6-disulphonic acid | blue |
| 1-Amino-8-hydroxynaphthalene-3,6-disulphonic acid | 2-Methoxyaniline | —NH— | 2-Amino-8-hydroxynaphthalene-6-sulphonic acid | blue |
| 1-(4'-Sulphophenyl)-3-methyl-5-pyrazolone | 2-Ethoxyaniline | —NH— | 1-(4'-Sulphophenyl)-3-methyl-5-pyrazolone | orange |
| 2-Hydroxybenzoic acid | " | —NH— | 2-Amino-8-hydroxynaphthalene-6-sulphonic acid | brown |
| " | " | —NH— | 2-Carboxymethylamino-8-hydroxynaphthalene-6-sulphonic acid | brown |
| 1-Amino-8-hydroxynaphthalene-3,6-disulphonic acid | " | —NH— | 1-Amino-8-hydroxynaphthalene-3,6-disulphonic acid | blue |
| " | " | —NH— | 2-Amino-8-hydroxynaphthalene-6-sulphonic acid | blue |
| 1-(4'-Sulphophenyl)-3-methyl-5-pyrazolone | 2-Chloroaniline | —NH— | 1-(4'-Sulphophenyl)-3-methyl-5-pyrazolone | orange |
| 2-Hydroxybenzoic acid | " | —NH— | 2-Amino-8-hydroxynaphthalene-6-sulphonic acid | brown |
| 2-Hydroxybenzoic acid | 2-Chloroaniline | —NH— | 2-Carboxymethylamino-8-hydroxynaphthalene-6-sulphonic acid | brown |
| 1-Amino-8-hydroxynaphthalene-3,6-disulphonic acid | " | —NH— | 1-Amino-8-hydroxynaphthalene-3,6-disulphonic acid | blue |
| " | " | —NH— | 2-Amino-8-hydroxynaphthalene-6-sulphonic acid | " |
| 1-(4'-Sulphophenyl)-3-methyl-5-pyrazolone | 3-Chloroaniline | —NH— | 1-(4'-Sulphopenyl)-3-methyl-5-pyrazolone | orange |
| 2-Hydroxybenzoic acid | " | —NH— | 2-Amino-8-hydroxy- | brown |

Table I-continued

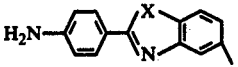

| Coupling component B₁—H | Diazotisable Coupling component M—NH₂ | X - | Coupling component B₂—H | Colour shade on cotton |
|---|---|---|---|---|
| " | " | —NH— | naphthalene-6-sulphonic acid 2-Carboxymethylamino-8-hydroxynaphthalene-6-sulphonic acid | brown |
| 1-Amino-8-hydroxy-naphthalene-3,6-disulphonic acid | " | —NH— | 1-Amino-8-hydroxy-naphthalene-3,6-disulphonic acid | blue |
| " | " | —NH— | 2-Amino-8-hydroxy-naphthalene-6-sulphonic acid | blue |
| 1-Amino-8-hydroxy-naphthalene-3,6-disulphonic acid | 2-Methoxy-5-methyl-aniline | —O— | 1-Amino-8-hydroxy-naphthalene-3,6-disulphonic acid | blue |
| " | " | —S— | " | " |
| " | " | —S—, 6-CH₃ | " | " |
| " | " | —N(CH₃)— | " | " |
| " | " | —N(C₆H₅)— | " | " |
| " | " | —NH—, 4-CH₃ | " | " |
| " | " | —NH—, 7-Cl | " | " |
| " | " | —NH—, 2'-CH₃ | " | " |
| " | " | —NH—, 3'-CH₃ | " | " |
| " | " | —NH—, 2'-Cl | " | " |
| " | " | —NH—, 3'-Cl | " | " |
| " | " | —NH—, 7-Cl, 3'-Cl | " | " |

Table II

| Coupling component B₁—H | Diazotisable coupling component M—NH₂ | X— | Coupling component B₂—H | Colour shade on cotton |
|---|---|---|---|---|
| 2-Hydroxybenzoic acid | 2-Methoxy-5-methyl-aniline | —O— | 2-Amino-8-hydroxy-naphthalene-6-sulphonic acid | brown |
| 2-Hydroxybenzoic acid | 2-Methoxy-5-methyl-aniline | —O— | 2-Carboxymethylamino-naphthalene-6-sulphonic acid | brown |
| 1-Amino-8-hydroxy-naphthalene-3,6-disulphonic acid | 2-Methoxy-5-methyl-aniline | —O— | 1-Amino-8-hydroxy-naphthalene-3,6-disulphonic acid | blue |
| 1-Amino-8-hydroxy-naphthalene-3,6-disulphonic acid | 2-Methoxy-5-methyl-aniline | —S— | 1-Amino-8-hydroxy-naphthalene-3,6-disulphonic acid | blue |
| 1-(4'-Sulphophenyl)-3-methyl-5-pyrazolone | 2-Methoxy-5-methyl-aniline | —S— | 1-(4'-Sulphophenyl)-3-methyl-5-pyrazolone | orange |

We claim:

1. A water soluble trisazo dyestuff of the formula $B_1-N=N-Z-N=N-M-N=N-B_2$ wherein M is

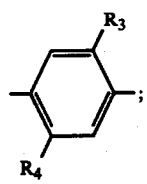

B₁ and B₂ are the same or different and are selected from the group consisting of

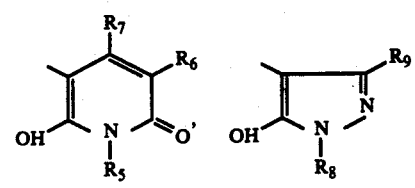

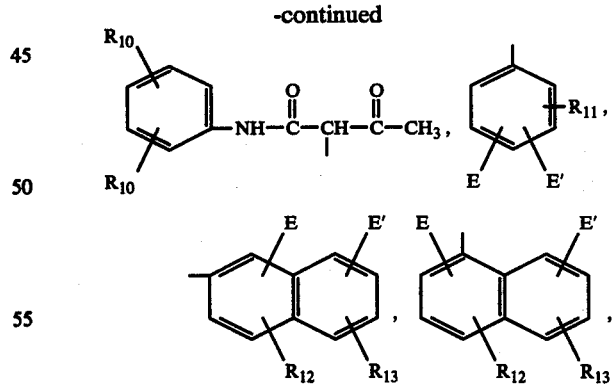

2,4-dihydroxy-3-quinolyl and 2,6-diamino-5-pyridyl;

Z is

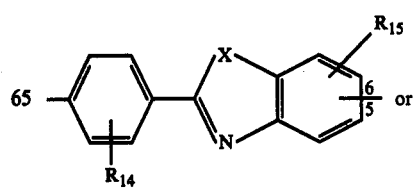

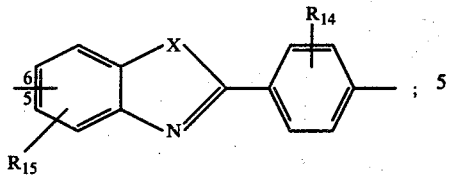

X is

—O— or —S—; $R_1$ is hydrogen, alkyl having 1 to 4 carbon atoms, phenyl or benzyl; $R_3$ is hydrogen, chloro or alkyl or alkoxy having 1 to 4 carbon atoms;

- $R_4$ is hydrogen chloro, alkyl or alkoxy having 1 to 4 carbon atoms, hydroxy, alkanoylamino having 1 to 4 carbon atoms, benzoylamino, naphthoylamino, oxalylamino, carboxyalkylamino having 2 to 5 carbon atoms, sulphoalkylamino having 1 to 4 carbon atoms or oxyalkylamino having 1 to 4 carbon atoms;
- $R_5$ is hydrogen or alkyl having 1 to 8 carbon atoms; $R_6$ is —CN, —COOH, —CONH$_2$ or —SO$_3$H; $R_7$ is hydrogen or alkyl having 1 to 4 carbon atoms; $R_8$ is hydrogen, phenyl or phenyl substituted with a methyl, nitro, chloro or sulpho; $R_9$ is methyl, carboxyl or alkoxycarbonyl having 2 to 5 carbon atoms; $R_{10}$ is hydrogen, methyl, methoxy, chloro, —COOH or —SO$_3$H;
- E is a hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 5 carbon atoms, sulphoalkylamino having 1 to 4 carbon atoms, hydroxyalkylamino having 1 to 4 carbon atoms or dialkylamino having 1 to 4 carbon atoms in each alkyl;
- E′ is hydrogen or the same or a different member of the group of substituents standing for E,
- $R_{11}$, $R_{12}$ and $R_{13}$ are alkyl or alkoxy having 1 to 4 carbon atoms, carboxyl, sulpho, chloro, bromo, nitro or methoxycarbonyl; $R_{14}$ and $R_{15}$ are hydrogen, methyl, ethyl, methoxy, ethoxy or chloro; with the proviso that at least one of M, $B_1$ and $B_2$ includes a sulpho substituent.

2. A water soluble trisazo dyestuff of claim 1 wherein $B_1$, $B_2$ or both is

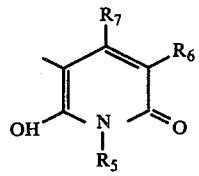

3. A water soluble trisazo dyestuff of claim 1 wherein $B_1$, $B_2$ or both is

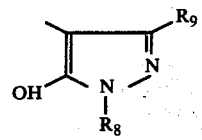

4. A water soluble trisazo dyestuff of claim 1 wherein $B_1$, $B_2$ or both is

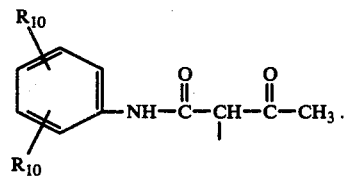

5. A water soluble trisazo dyestuff of the formula

wherein M is

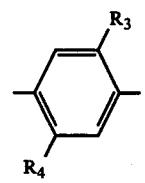

$B_1$ and $B_2$ are the same or different and are selected from the group consisting of

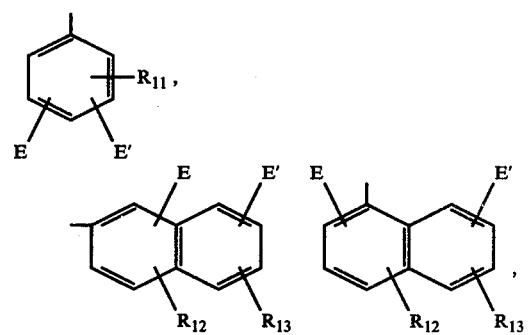

Z is selected from the group consisting of

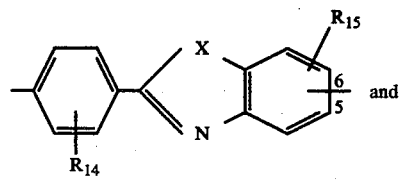

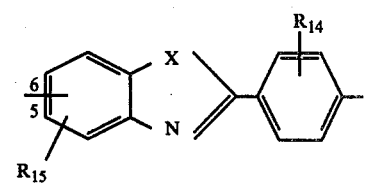

X is

—O— or —S—; $R_1$ is hydrogen, alkyl having 1 to 4 carbon atoms, phenyl or benzyl; $R_3$ is hydrogen, chloro or alkyl or alkoxy having 1 to 4 carbon atoms;

$R_4$ is hydrogen chloro, alkyl or alkoxy having 1 to 4 carbon atoms, hydroxy, alkanoylamino having 1 to 4 carbon atoms, benzoylamino, naphthoylamino, oxalylamino, carboxyalkylamino having 2 to 5 carbon atoms, sulphoalkylamino having 1 to 4 carbon atoms or oxyalkylamino having 1 to 4 carbon atoms;

E is a hydroxyl, amino, alkylamino having 1 to 4 carbon atoms, phenylamino, naphthylamino, benzoylamino, naphthoylamino, alkanoylamino having 2 to 5 carbon atoms, carboxyalkylamino having 2 to 5 carbon atoms, sulphoalkylamino having 1 to 4 carbon atoms, hydroxyalkylamino having 1 to 4 carbon atoms or dialkylamino having 1 to 4 carbon atoms in each alkyl;

E' is hydrogen or the same or a different member of the group of substituents standing for E;

$R_{11}$, $R_{12}$ and $R_{13}$ are alkyl or alkoxy having 1 to 4 carbon atoms, carboxyl, sulpho, chloro, bromo, nitro or methoxycarbonyl; $R_{14}$ and $R_{15}$ are hydrogen, methyl, ethyl, methoxy, ethoxy or chloro; with the proviso that at least one of M, $B_1$ and $B_2$ includes a sulpho substituent.

6. A water soluble trisazo dyestuff of claim 5 wherein $B_1$, $B_2$ or both is

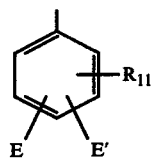

7. A water soluble trisazo dyestuff of claim 5 wherein $B_1$, $B_2$ or both is

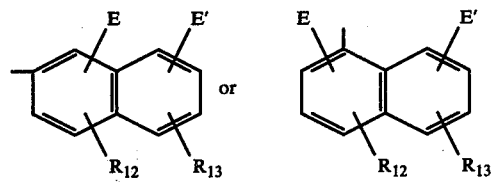

8. A water soluble trisazo dyestuff of claim 5 wherein X is

9. A water soluble trisazo dyestuff of claim 5 wherein $R_{14}$ and $R_{15}$ are the same or different and are selected from the group consisting of hydrogen, chloro and methyl.

10. A water soluble trisazo dyestuff of claim 5 having from 2–4 sulpho substituents.

11. A water soluble trisazo dyestuff according to claim 5 having the formula

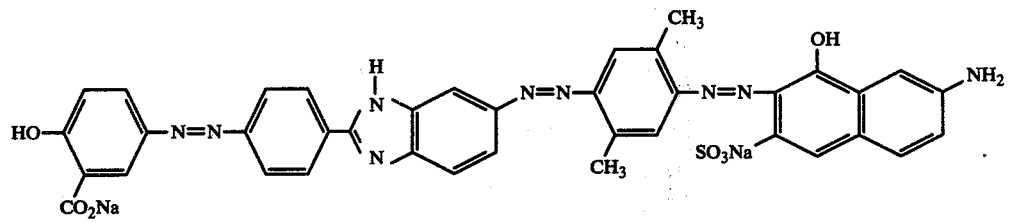

12. A water soluble trisazo dyestuff according to claim 5 having the formula

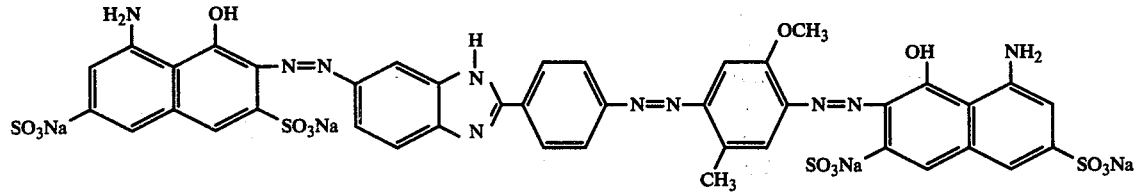

13. A water soluble trisazo dyestuff according to claim 5 having the formula

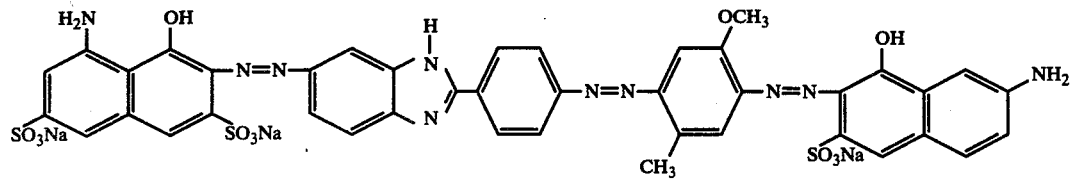

* * * * *